US010135663B2

(12) United States Patent
Qu et al.

(10) Patent No.: US 10,135,663 B2
(45) Date of Patent: Nov. 20, 2018

(54) FBMC SIGNAL TRANSMITTING METHOD AND RECEIVING METHOD, TRANSMITTER AND RECEIVER

(71) Applicant: Huawei Technologies Co., Ltd., Shenzhen (CN)

(72) Inventors: Daiming Qu, Wuhan (CN); Tao Jiang, Wuhan (CN); Jun Li, Wuhan (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/431,472

(22) Filed: Feb. 13, 2017

(65) Prior Publication Data
US 2017/0171010 A1    Jun. 15, 2017

Related U.S. Application Data
(63) Continuation of application No. PCT/CN2014/084289, filed on Aug. 13, 2014.

(51) Int. Cl.
*H04L 5/12* (2006.01)
*H04L 23/02* (2006.01)
(Continued)

(52) U.S. Cl.
CPC ......... *H04L 27/2698* (2013.01); *H04B 1/123* (2013.01); *H04L 27/264* (2013.01);
(Continued)

(58) Field of Classification Search
CPC .... H04L 27/34; H04L 27/3405; H04L 1/0003
See application file for complete search history.

(56) References Cited

U.S. PATENT DOCUMENTS

| 9,178,727 B2* | 11/2015 | Dore ................. H04L 25/03159 |
| 2004/0114507 A1* | 6/2004 | Yoo ..................... H04L 27/2626 370/208 |

(Continued)

FOREIGN PATENT DOCUMENTS

| CN | 101272371 A | 9/2008 |
| CN | 102273113 A | 12/2011 |

(Continued)

OTHER PUBLICATIONS

Zakaria et al., "A Novel Filter-Bank Multicarrier Scheme to Mitigate the Intrinsic Interference: Application to MIMO Systems," IEEE Transactions on Wireless Communications, vol. 11, No. 3, pp. 1112-1123, Institute of Electrical and Electronics Engineers, New York, New York (Mar. 2012).

(Continued)

*Primary Examiner* — Shuwang Liu
*Assistant Examiner* — Gina McKie
(74) *Attorney, Agent, or Firm* — Leydig, Voit & Mayer, Ltd.

(57) ABSTRACT

An FBMC signal transmitting method and receiving method, a transmitter, and a receiver are provided. The transmitting method includes: generating offset quadrature amplitude modulation OQAM symbols included on at least two subbands; mapping an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval; generating an FBMC signal out of (Continued)

the frequency-domain signal; and transmitting the FBMC signal to a receiver.

17 Claims, 11 Drawing Sheets

(51) Int. Cl.
    *H04L 27/26*     (2006.01)
    *H04L 27/34*     (2006.01)
    *H04B 1/12*     (2006.01)
    *H04L 27/36*     (2006.01)

(52) U.S. Cl.
    CPC .......... *H04L 27/2627* (2013.01); *H04L 27/34* (2013.01); *H04L 27/362* (2013.01); *H04L 27/365* (2013.01); *H04L 27/366* (2013.01)

(56) References Cited

U.S. PATENT DOCUMENTS

| | | | |
|---|---|---|---|
| 2004/0252772 A1 | 12/2004 | Renfors et al. | |
| 2009/0268837 A1 | 10/2009 | Kimura et al. | |
| 2011/0110458 A1 | 5/2011 | Siohan et al. | |
| 2011/0182332 A1 | 7/2011 | Ericson et al. | |
| 2011/0305286 A1 | 12/2011 | Shimezawa et al. | |
| 2012/0189036 A1* | 7/2012 | Bellanger | H04L 27/2631 375/146 |
| 2014/0192925 A1* | 7/2014 | Li | H04L 25/08 375/297 |
| 2016/0191218 A1* | 6/2016 | Bala | H04L 5/0007 370/203 |
| 2016/0261388 A1* | 9/2016 | Farhang-Boroujeny | H04B 7/0452 |
| 2017/0233437 A1* | 8/2017 | Alanine | C07K 5/0827 514/2.8 |

FOREIGN PATENT DOCUMENTS

| | | |
|---|---|---|
| CN | 103825862 A | 5/2014 |
| CN | 103888406 A | 6/2014 |
| RU | 2005124265 A | 1/2006 |
| RU | 2454808 C2 | 6/2012 |
| WO | 2013017930 A2 | 2/2013 |
| WO | 2014085710 A1 | 6/2014 |

OTHER PUBLICATIONS

Lele et al., "CDMA Transmission with Complex OFDM/OQAM," Research article, Hindawi Publishing Corporation (2007).

Schellmann et al., "FBMC-based air interface for 5G Mobile: Challenges and proposed solutions," 9th International Conference on Cognitive Radio Oriented Wireless Networks (CROWNCOM), pp. 102-107, XP 032616104, ICST, (2014).

Zakaria et al., "On ISI cancellation in MIMO-ML detection using FBMC/QAM modulation," 2012 International Symposium on Wireless Communications Systems (ISWCS), pp. 949-953, XP032263900, Institute of Electrical and Electronics Engineers, New York, New York (2012).

Hosseinali et al., "Uplink Resource Allocation for Cognitive Radio Systems: QAM-OFDM or OQAM-OFDM?," 6th International Symposium on Telecommunications (IST'2012), pp. 188-193, XP32346057, Institute of Electrical and Electronics Engineers, New York, New York (2012).

Bellanger et al.,"FBMC physical layer : a primer," PHYDYAS, Seventh Framework Programme, (Jun. 2010).

Yli-Kaakinen, et al., "Fast-Convolution Filter Bank Approach for Non-Contiguous Spectrum Use", Future Network and MobileSummit 2013 Conference Proceedings, IIMC International Information Management Corporation (2013).

Berg et al., "A Flexible FS-FBMC Receiver for Dynamic Access in the TVWS", 2014 9th International Conference on CROWNCOM, Institute of Electrical and Electronics Engineers, New York, New York (2014).

* cited by examiner

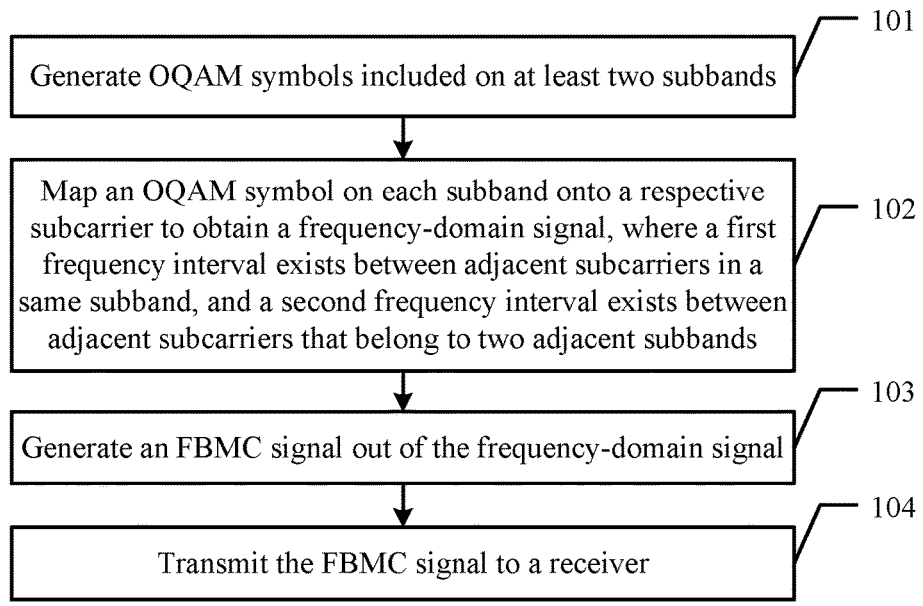
FIG. 1
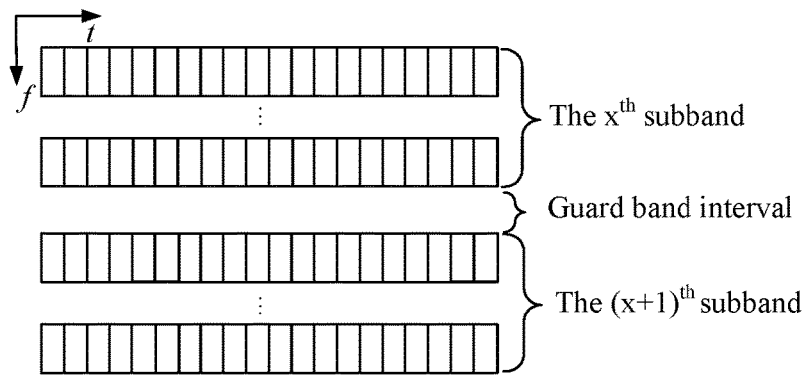
FIG. 2-A

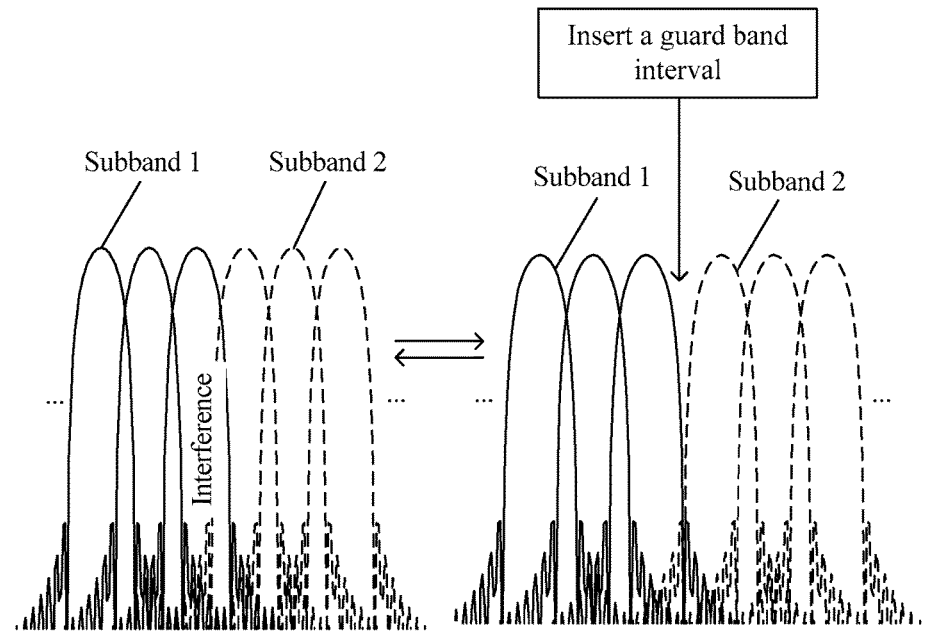
FIG. 2-B
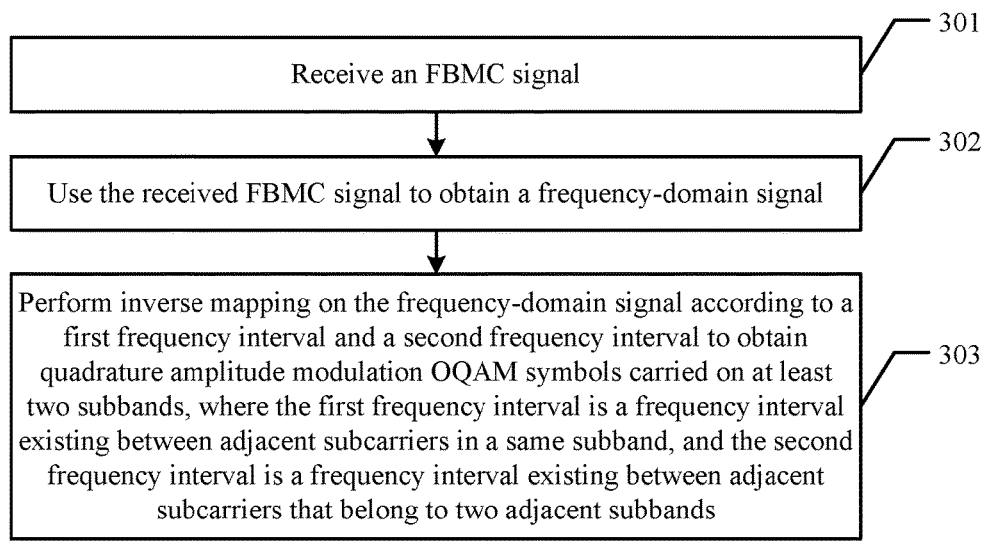
FIG. 3

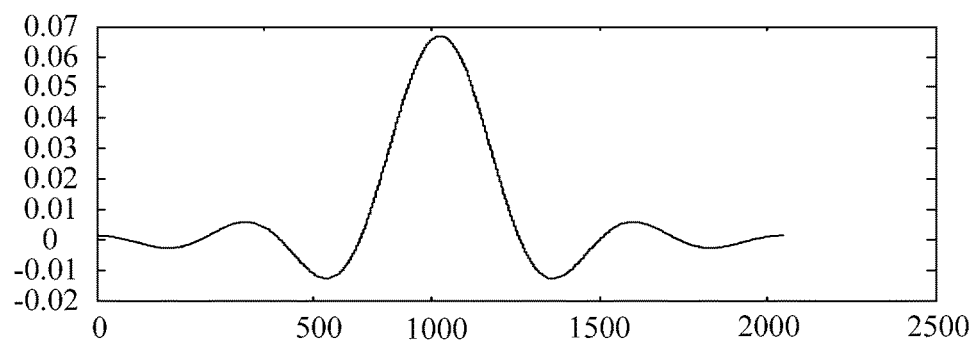
FIG. 4-A
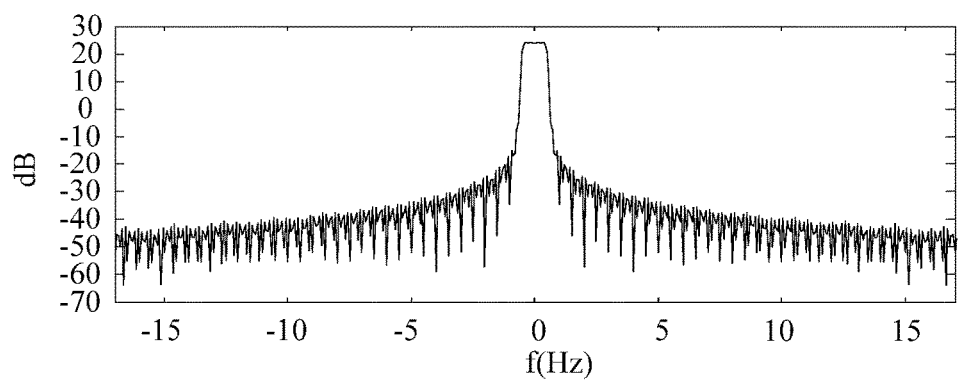
FIG. 4-B

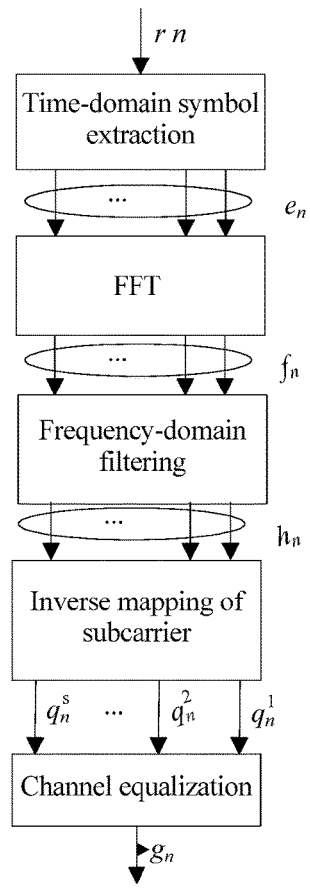
FIG. 8
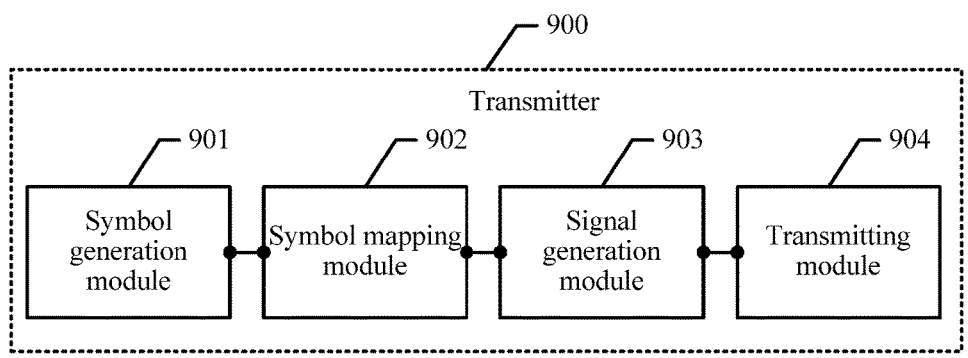
FIG. 9-A

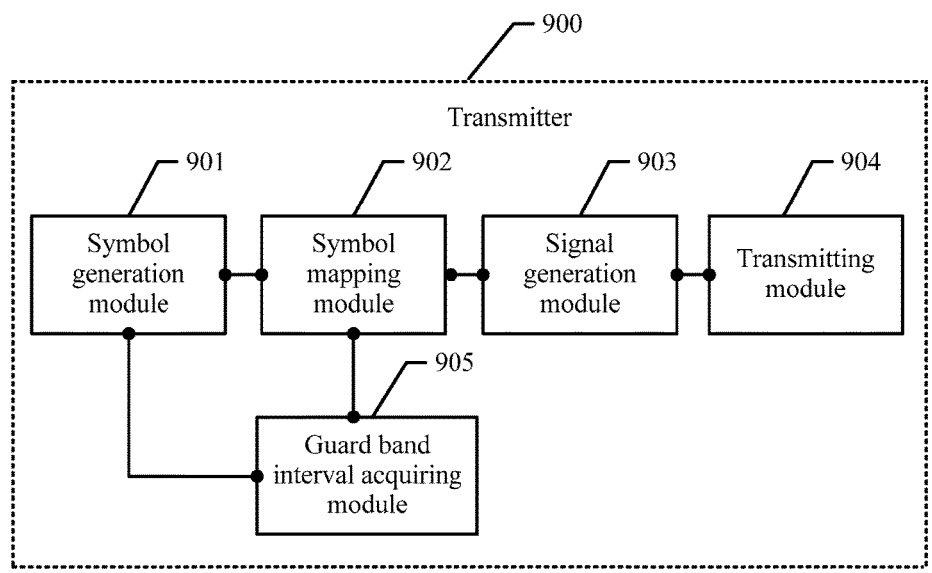
FIG. 9-B
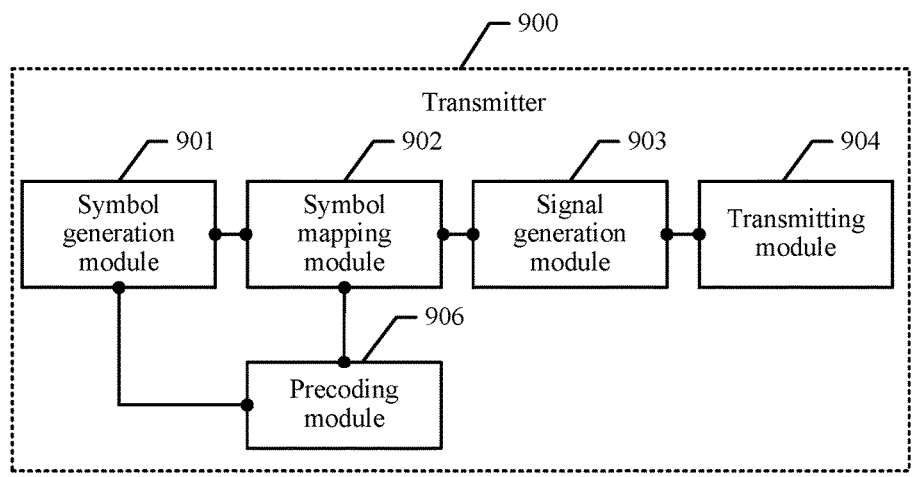
FIG. 9-C

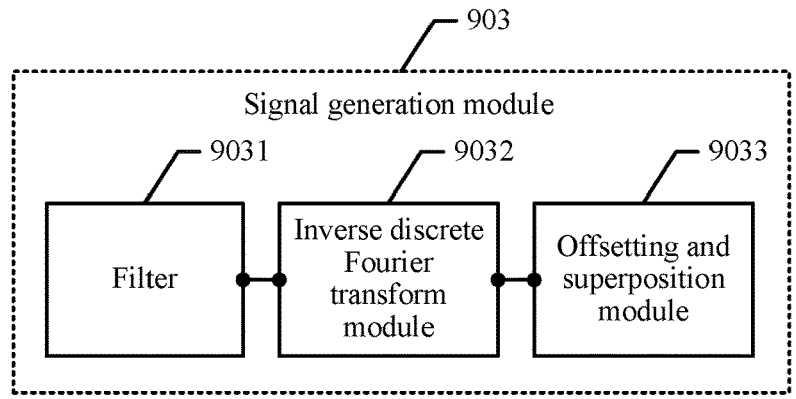
FIG. 9-D
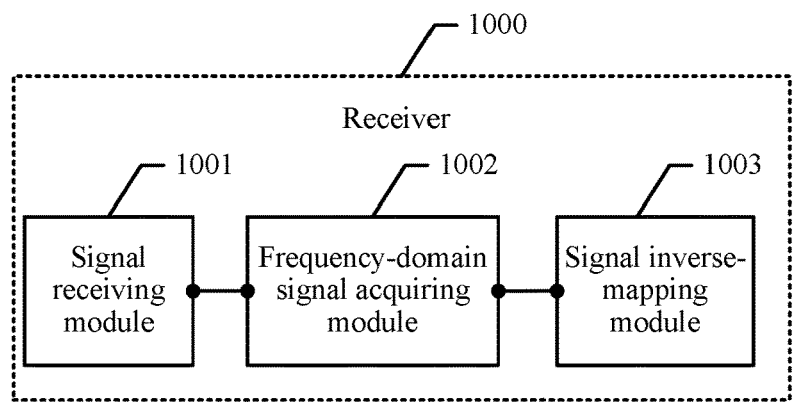
FIG. 10-A
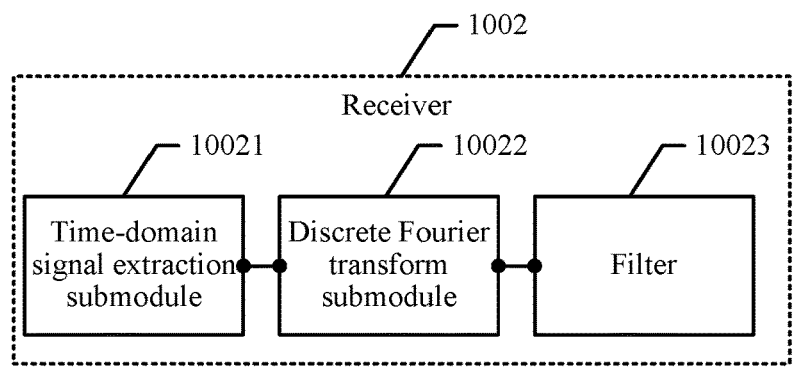
FIG. 10-B

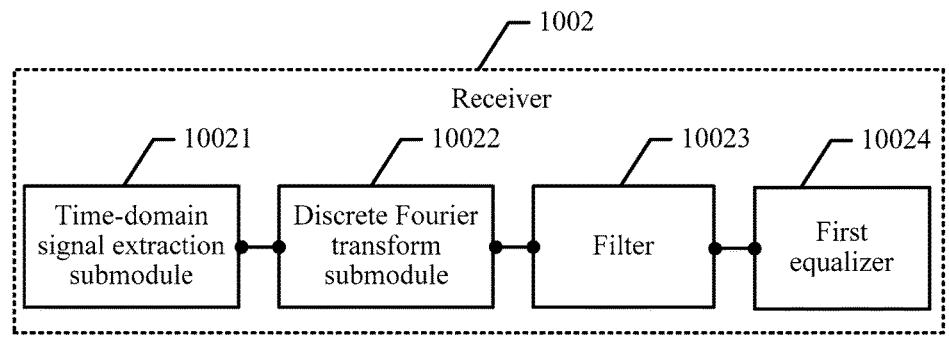
FIG. 10-C
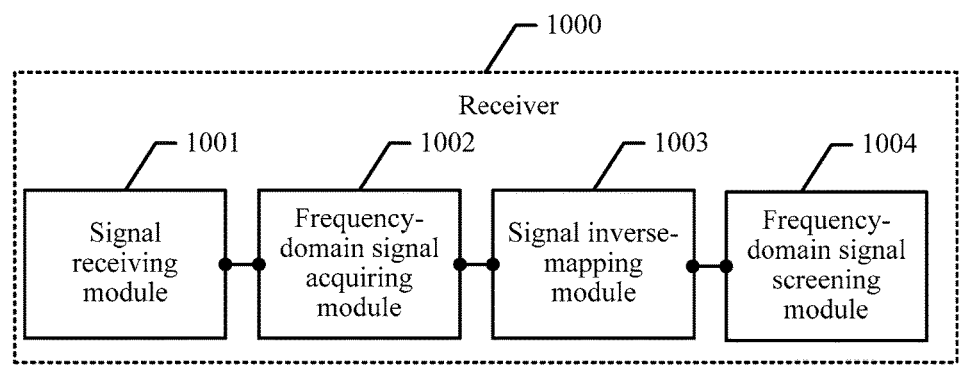
FIG. 10-D
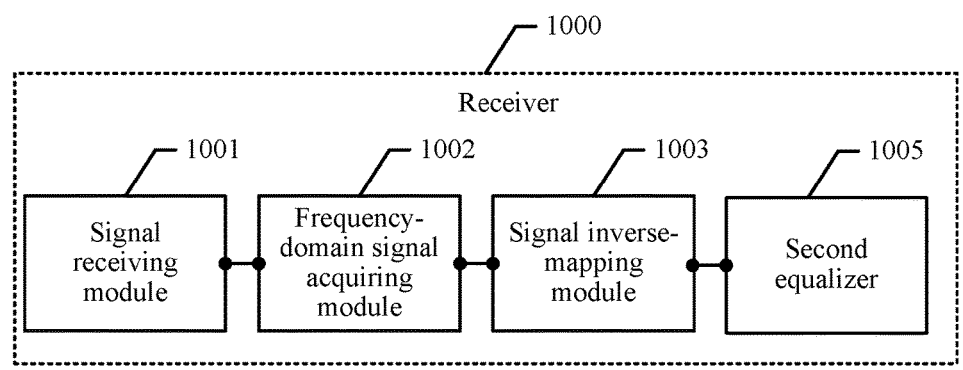
FIG. 10-E

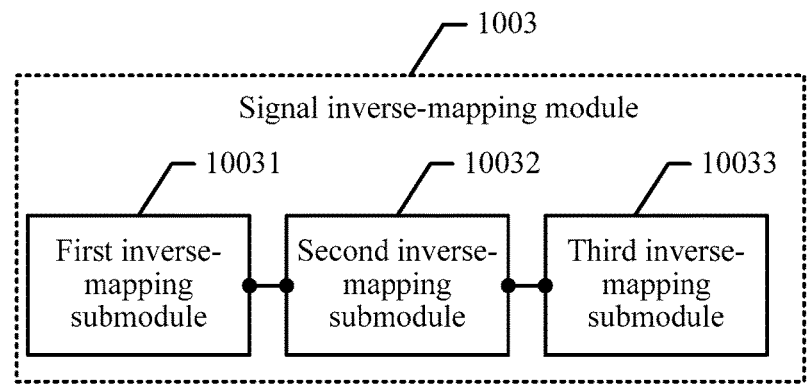
FIG. 10-F
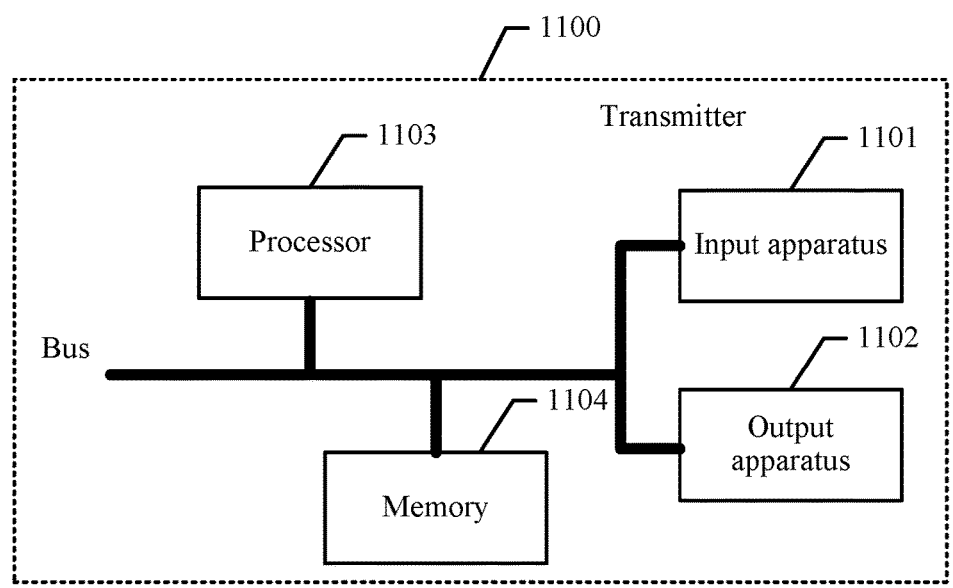
FIG. 11

FBMC SIGNAL TRANSMITTING METHOD AND RECEIVING METHOD, TRANSMITTER AND RECEIVER

CROSS-REFERENCE TO RELATED APPLICATIONS

This application is a continuation of International Application No. PCT/CN2014/084289, filed on Aug. 13, 2014, the disclosure of which is hereby incorporated by reference in its entirety.

TECHNICAL FIELD

Embodiments of the present invention relate to the field of communications technologies, and in particular, to a filter bank multi-carrier (FBMC) signal transmitting method and receiving method, a transmitter, and a receiver.

BACKGROUND

FBMC is a multi-carrier modulation technology. Compared with orthogonal frequency division multiplexing (OFDM), the FBMC has lower out-of-band radiation and higher spectrum efficiency, and has promising prospects of application. An important characteristic of the FBMC is that mutual interference, to different extents, exists between adjacent subcarriers and between adjacent FBMC symbols. For example, a transmitted symbol on any time-frequency resource generates an additional received signal at a position of an adjacent time-frequency resource, thereby causing interference to a wanted received signal.

A typical FBMC implementation solution is using an OFDM/offset quadrature amplitude modulation (OQAM) technology. A difference of OFDM/OQAM from the OFDM lies in that pure-real-number or pure-imaginary-number OQAM symbols are transmitted in an OFDM/OQAM system, and are mapped onto time-frequency resource elements by using a law of real-imaginary alternation. However, interference caused by a transmitted symbol to a received signal always occurs on an imaginary part or real part that is corresponding to the transmitted symbol. Therefore, if a channel can keep unchanged in time-domain and frequency-domain ranges, the interference can be canceled by performing an operation of separating the real part from the imaginary part after channel equalization is performed.

However, in an actual application, generally, the channel cannot be unchanged in the time-domain and frequency-domain ranges. If the channel changes significantly in a time-domain or frequency-domain dimension, mutual interference is still generated between transmitted symbols in a time-domain border or frequency-domain border in which the channel changes. In a broadband multi-carrier system, a change of a channel in a frequency domain is relatively sharp, and the broadband multi-carrier system widely uses a frequency division multiple access technology, which also leads to a significant change of the channel in the frequency domain. Therefore, how to cancel mutual interference in the frequency-domain border is still pending.

SUMMARY

Embodiments of the present invention provide an FBMC signal transmitting method and receiving method, a transmitter, and a receiver, which can effectively cancel mutual interference in a frequency-domain border.

According to a first aspect, an embodiment of the present invention provides an FBMC signal transmitting method, including:

generating offset quadrature amplitude modulation OQAM symbols included on at least two subbands;

mapping an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval;

generating an FBMC signal out of the frequency-domain signal; and transmitting the FBMC signal to a receiver.

With reference to the first aspect, in a first possible implementation manner of the first aspect, for OQAM symbols that belong to a same subband, the mapping an OQAM symbol on each subband onto a respective subcarrier includes:

mapping the $n^{th}$ OQAM symbol on the $x^{th}$ subband onto the $y^{th}$ subcarrier; and mapping the $(n+1)^{th}$ OQAM symbol on the $x^{th}$ subband onto the $(y+1)^{th}$ subcarrier; where the first frequency interval $\Delta f$ exists between the $y^{th}$ subcarrier and the $(y+1)^{th}$ subcarrier, x refers to any one of the at least two subbands, n refers to any OQAM symbol on the $x^{th}$ subband, the $n^{th}$ OQAM symbol and the $(n+1)^{th}$ OQAM symbol are two adjacent OQAM symbols on the $x^{th}$ subband, and x, y, and n are positive integers.

With reference to the first possible implementation manner of the first aspect, in a second possible implementation manner of the first aspect, after the mapping the $n^{th}$ OQAM symbol on the $x^{th}$ subband onto the $y^{th}$ subcarrier and the mapping the $(n+1)^{th}$ OQAM symbol on the $x^{th}$ subband onto the $(y+1)^{th}$ subcarrier, that the first frequency interval $\Delta f$ exists between the $y^{th}$ subcarrier and the $(y+1)^{th}$ subcarrier is implemented in the following manner:

inserting $(k-1)$ zeros between the $n^{th}$ OQAM symbol and the $(n+1)^{th}$ OQAM symbol, where k is an overlap factor of a prototype filter.

With reference to the first aspect, in a third possible implementation manner of the first aspect, for OQAM symbols that respectively belong to two subbands, the mapping an OQAM symbol on each subband onto a respective subcarrier includes:

mapping the last OQAM symbol on the $x^{th}$ subband onto the $z^{th}$ subcarrier; and mapping the first OQAM symbol on the $(x+1)^{th}$ subband onto the $(z+1)^{th}$ subcarrier; where the second frequency interval $(m+1)\Delta f$ exists between the $z^{th}$ subcarrier and the $(z+1)^{th}$ subcarrier, where $\Delta f$ represents the first frequency interval, $m\Delta f$ is the guard band interval, m is a fraction greater than 0, and both x and z are positive integers.

With reference to the third possible implementation manner of the first aspect, in a fourth possible implementation manner of the first aspect, after the mapping the last OQAM symbol on the $x^{th}$ subband onto the $z^{th}$ subcarrier and the mapping the first OQAM symbol on the $(x+1)^{th}$ subband onto the $(z+1)^{th}$ subcarrier, that the second frequency interval $(m+1)\Delta f$ exists between the $z^{th}$ subcarrier and the $(z+1)^{th}$ subcarrier is implemented in the following manner:

inserting $(k+p-1)$ zeros between the last OQAM symbol and the first OQAM symbol, where k is an overlap factor of a prototype filter, and p is an outband suppression factor of the prototype filter.

With reference to the first aspect, or the first or second or third possible implementation manner of the first aspect, in a fifth possible implementation manner of the first aspect, before the mapping an OQAM symbol on each subband onto a respective subcarrier, the method further includes:

acquiring the guard band interval according to the overlap factor and outband suppression factor of the prototype filter, and the first frequency interval, where the guard band interval is acquired in the following manner:

$$G = \frac{P}{K}\Delta f,$$

where

G is the guard band interval, K is the overlap factor of the prototype filter, P is the outband suppression factor of the prototype filter, and Δf is the first frequency interval.

With reference to the first aspect, in a sixth possible implementation manner of the first aspect, before the generating an FBMC signal out of the frequency-domain signal, the method further includes:

performing precoding on the OQAM symbol on each subband in the frequency-domain signal.

With reference to the first aspect, in a seventh possible implementation manner of the first aspect, the generating offset quadrature amplitude modulation OQAM symbols on at least two subbands includes:

generating OQAM symbols carried on a same subband for a same user.

With reference to the first aspect, or the first or second or third possible implementation manner of the first aspect, in an eighth possible implementation manner of the first aspect, the generating an FBMC signal out of the frequency-domain signal includes:

performing frequency-domain filtering on the frequency-domain signal;

performing inverse discrete Fourier transform IDFT on the frequency-domain signal obtained after frequency-domain filtering, to obtain a time-domain signal; and performing time-domain offsetting and superposition on the time-domain signal to obtain the FBMC signal.

According to a second aspect, an embodiment of the present invention further provides an FBMC signal receiving method, including:

receiving an FBMC signal;

using the received FBMC signal to obtain a frequency-domain signal; and performing inverse mapping on the frequency-domain signal according to a first frequency interval and a second frequency interval to obtain quadrature amplitude modulation OQAM symbols carried on at least two subbands, where the first frequency interval is a frequency interval existing between adjacent subcarriers in a same subband, the second frequency interval is a frequency interval existing between adjacent subcarriers that belong to two adjacent subbands, the second frequency interval is a sum of the first frequency interval and a guard band interval, and the guard band interval is a fractional multiple of the first frequency interval.

With reference to the second aspect, in a first possible implementation manner of the second aspect, the using the received FBMC signal to obtain the frequency-domain signal includes:

performing time-domain symbol extraction on the received FBMC signal to obtain a time-domain signal;

performing discrete Fourier transform DFT on the time-domain signal obtained by time-domain symbol extraction, to obtain a DFT-transformed signal; and performing frequency-domain filtering on the DFT-transformed signal to obtain the frequency-domain signal.

With reference to the first possible implementation manner of the second aspect, in a second possible implementation manner of the second aspect, before the performing frequency-domain filtering on the DFT-transformed signal, the method further includes:

performing channel equalization on the DFT-transformed signal.

With reference to the second aspect, in a third possible implementation manner of the second aspect, if the received FBMC signal is a downlink signal, after the using the received FBMC signal to obtain a frequency-domain signal, the method further includes:

screening out, from the frequency-domain signal, a frequency-domain signal mapped onto a preset subcarrier; and the performing inverse mapping on the frequency-domain signal according to a first frequency interval and a second frequency interval includes:

performing, according to the first frequency interval and the second frequency interval, inverse mapping on the frequency-domain signal mapped onto the preset subcarrier.

With reference to the second aspect, in a fourth possible implementation manner of the second aspect, after the performing inverse mapping on the frequency-domain signal according to a first frequency interval and a second frequency interval to obtain quadrature amplitude modulation OQAM symbols carried on at least two subbands, the method further includes:

performing channel equalization on the OQAM symbols.

With reference to the second aspect, in a fifth possible implementation manner of the second aspect, the performing inverse mapping on the frequency-domain signal according to a first frequency interval and a second frequency interval to obtain quadrature amplitude modulation OQAM symbols carried on at least two subbands includes:

extracting, from the $x^{th}$ subband of the frequency-domain signal according to the second frequency interval, the first OQAM symbol carried on the $x^{th}$ subband;

after the first OQAM symbol carried on the $x^{th}$ subband is extracted, successively extracting, from the $x^{th}$ subband of the frequency-domain signal according to the first frequency interval, the second OQAM symbol to the last OQAM symbol carried on the $x^{th}$ subband; and extracting, according to the second frequency interval, the first OQAM symbol carried on the $(x+1)^{th}$ subband from the $(x+1)^{th}$ subband of the frequency-domain signal; where x refers to any subband in the frequency-domain signal.

According to a third aspect, an embodiment of the present invention provides a transmitter, including:

a symbol generation module, configured to generate offset quadrature amplitude modulation OQAM symbols included on at least two subbands;

a symbol mapping module, configured to map an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval;

a signal generation module, configured to generate an FBMC signal out of the frequency-domain signal; and a transmitting module, configured to transmit the FBMC signal to a receiver.

With reference to the third aspect, in a first possible implementation manner of the third aspect, for OQAM symbols that belong to a same subband, the symbol mapping module is specifically configured to: map the $n^{th}$ OQAM symbol on the $x^{th}$ subband onto the $y^{th}$ subcarrier; and map the $(n+1)^{th}$ OQAM symbol on the $x^{th}$ subband onto the $(y+1)^{th}$ subcarrier; where the first frequency interval $\Delta f$ exists between the $y^{th}$ subcarrier and the $(y+1)^{th}$ subcarrier, x refers to any one of the at least two subbands, n refers to any OQAM symbol on the $x^{th}$ subband, the $n^{th}$ OQAM symbol and the $(n+1)^{th}$ OQAM symbol are two adjacent OQAM symbols on the $x^{th}$ subband, and x, y, and n are positive integers.

With reference to the first possible implementation manner of the third aspect, in a second possible implementation manner of the third aspect, after the mapping the $n^{th}$ OQAM symbol on the $x^{th}$ subband onto the $y^{th}$ subcarrier and the mapping the $(n+1)^{th}$ OQAM symbol on the $x^{th}$ subband onto the $(y+1)^{th}$ subcarrier, that the first frequency interval $\Delta f$ exists between the $y^{th}$ subcarrier and the $(y+1)^{th}$ subcarrier is implemented in the following manner:

inserting (k−1) zeros between the $n^{th}$ OQAM symbol and the $(n+1)^{th}$ OQAM symbol, where k is an overlap factor of a prototype filter.

With reference to the third aspect, in a third possible implementation manner of the third aspect, for OQAM symbols that respectively belong to two subbands, the symbol mapping module is specifically configured to: map the last OQAM symbol on the $x^{th}$ subband onto the $z^{th}$ subcarrier; and map the first OQAM symbol on the $(x+1)^{th}$ subband onto the $(z+1)^{th}$ subcarrier; where the second frequency interval $(m+1)\Delta f$ exists between the $z^{th}$ subcarrier and the $(z+1)^{th}$ subcarrier, where $\Delta f$ represents the first frequency interval, $m\Delta f$ is the guard band interval, m is a fraction greater than 0, and both x and z are positive integers.

With reference to the third possible implementation manner of the third aspect, in a fourth possible implementation manner of the third aspect, after the mapping the last OQAM symbol on the $x^{th}$ subband onto the $z^{th}$ subcarrier and the mapping the first OQAM symbol on the $(x+1)^{th}$ subband onto the $(z+1)^{th}$ subcarrier, that the second frequency interval $(m+1)\Delta f$ exists between the $z^{th}$ subcarrier and the $(z+1)^{th}$ subcarrier is implemented in the following manner:

inserting (k+p−1) zeros between the last OQAM symbol and the first OQAM symbol, where k is an overlap factor of a prototype filter, and p is an outband suppression factor of the prototype filter.

With reference to the third aspect, or the first or second or third possible implementation manner of the third aspect, in a fifth possible implementation manner of the third aspect, the transmitter further includes:

a guard band interval acquiring module, configured to: before the symbol mapping module maps the OQAM symbol on each subband onto the respective subcarrier, acquire the guard band interval according to the overlap factor and outband suppression factor of the prototype filter, and the first frequency interval, where the guard band interval is acquired in the following manner:

$$G = \frac{P}{K}\Delta f,$$

where

G is the guard band interval, K is the overlap factor of the prototype filter, P is the outband suppression factor of the prototype filter, and $\Delta f$ is the first frequency interval.

With reference to the third aspect, in a sixth possible implementation manner of the third aspect, the transmitter further includes: a precoding module, configured to: before the signal generation module generates the FBMC signal out of the frequency-domain signal, perform precoding on the OQAM symbol on each subband in the frequency-domain signal.

With reference to the third aspect, in a seventh possible implementation manner of the third aspect, the symbol generation module is specifically configured to generate OQAM symbols carried on a same subband for a same user.

With reference to the third aspect, or the first or second or third possible implementation manner of the third aspect, in an eighth possible implementation manner of the third aspect, the signal generation module includes:

a filter, configured to perform frequency-domain filtering on the frequency-domain signal;

an inverse discrete Fourier transform module, configured to perform inverse discrete Fourier transform IDFT on the frequency-domain signal obtained after frequency-domain filtering, to obtain a time-domain signal; and an offsetting and superposition module, configured to perform time-domain offsetting and superposition on the time-domain signal to obtain the FBMC signal.

According to a fourth aspect, an embodiment of the present invention further provides a receiver, including:

a signal receiving module, configured to receive an FBMC signal;

a frequency-domain signal acquiring module, configured to use the received FBMC signal to obtain a frequency-domain signal; and a signal inverse-mapping module, configured to perform inverse mapping on the frequency-domain signal according to a first frequency interval and a second frequency interval to obtain quadrature amplitude modulation OQAM symbols carried on at least two subbands, where the first frequency interval is a frequency interval existing between adjacent subcarriers in a same subband, the second frequency interval is a frequency interval existing between adjacent subcarriers that belong to two adjacent subbands, the second frequency interval is a sum of the first frequency interval and a guard band interval, and the guard band interval is a fractional multiple of the first frequency interval.

With reference to the fourth aspect, in a first possible implementation manner of the fourth aspect, the frequency-domain signal acquiring module includes:

a time-domain signal extraction submodule, configured to perform time-domain symbol extraction on the received FBMC signal to obtain a time-domain signal;

a discrete Fourier transform submodule, configured to perform discrete Fourier transform DFT on the time-domain signal obtained by time-domain symbol extraction, to obtain a DFT-transformed signal; and a filter, configured to perform frequency-domain filtering on the DFT-transformed signal to obtain the frequency-domain signal.

With reference to the first possible implementation manner of the fourth aspect, in a second possible implementation manner of the fourth aspect, the frequency-domain signal acquiring module further includes:

a first equalizer, configured to perform channel equalization on the DFT-transformed signal before the filter performs frequency-domain filtering on the DFT-transformed signal.

With reference to the fourth aspect, in a third possible implementation manner of the fourth aspect, if the received FBMC signal is a downlink signal, the receiver further includes:

a frequency-domain signal screening module, configured to: after the frequency-domain signal acquiring module uses the received FBMC signal to obtain the frequency-domain signal, screen out, from the frequency-domain signal, a frequency-domain signal mapped onto a preset subcarrier; where the signal inverse-mapping module is specifically configured to perform, according to the first frequency interval and the second frequency interval, inverse mapping on the frequency-domain signal mapped onto the preset subcarrier.

With reference to the fourth aspect, in a fourth possible implementation manner of the fourth aspect, the receiver further includes:

a second equalizer, configured to perform channel equalization on the OQAM symbols after the signal inverse-mapping module performs inverse mapping on the frequency-domain signal according to the first frequency interval and the second frequency interval to obtain the quadrature amplitude modulation OQAM symbols carried on the at least two subbands.

With reference to the fourth aspect, in a fifth possible implementation manner of the fourth aspect, the signal inverse-mapping module includes:

a first inverse-mapping submodule, configured to extract, from the $x^{th}$ subband of the frequency-domain signal according to the second frequency interval, the first OQAM symbol carried on the $x^{th}$ subband;

a second inverse-mapping submodule, configured to: after the first OQAM symbol carried on the $x^{th}$ subband is extracted, successively extract, from the $x^{th}$ subband of the frequency-domain signal according to the first frequency interval, the second OQAM symbol to the last OQAM symbol carried on the $x^{th}$ subband; and a third inverse-mapping submodule, configured to extract, according to the second frequency interval, the first OQAM symbol carried on the $(x+1)^{th}$ subband from the $(x+1)^{th}$ subband of the frequency-domain signal; where x refers to any subband in the frequency-domain signal.

It can be learned, from the foregoing technical solutions, that the embodiments of the present invention have the following advantages:

In the embodiments of the present invention, after generating OQAM symbols included on at least two subbands, a transmitter maps an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval; then generates an FBMC signal out of the frequency-domain signal; and finally, transmits the FBMC signal to a receiver. The transmitter generates a second frequency interval between adjacent subcarriers of two adjacent subbands; therefore, compared with a first frequency interval between adjacent subcarriers in a same subband, the second frequency interval is a sum of the first frequency interval and a guard band interval, and the guard band interval can implement effective isolation between subcarriers of adjacent subbands. By using the guard band interval, it can be implemented that spectrums of adjacent subbands do not overlap, so as to achieve approximate orthogonality. Therefore, mutual interference generated because adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

BRIEF DESCRIPTION OF DRAWINGS

FIG. 1 is a schematic block flowchart of an FBMC signal transmitting method according to an embodiment of the present invention;

FIG. 2-A is a schematic diagram of an implementation manner of inserting a guard band interval between two adjacent subbands by a transmitter according to an embodiment of the present invention;

FIG. 2-B is a schematic diagram of an implementation manner of a comparison, according to an embodiment of the present invention, between mutual interference cancellation after a guard band interval is inserted between two adjacent subbands by a transmitter, and mutual interference cancellation before the guard band interval is inserted;

FIG. 3 is a schematic block flowchart of an FBMC signal receiving method according to an embodiment of the present invention;

FIG. 4-A is a schematic diagram of a time-domain characteristic of a filter according to an embodiment of the present invention;

FIG. 4-B is a schematic diagram of a spectrum characteristic of a filter according to an embodiment of the present invention;

FIG. 8 is a schematic diagram of another FBMC signal receiving method implemented by a receiver according to an embodiment of the present invention;

FIG. 9-A is a schematic structural diagram of a transmitter according to an embodiment of the present invention;

FIG. 9-B is a schematic structural diagram of another transmitter according to an embodiment of the present invention;

FIG. 9-C is a schematic structural diagram of another transmitter according to an embodiment of the present invention;

FIG. 9-D is a schematic structural diagram of a signal generation module according to an embodiment of the present invention;

FIG. 10-A is a schematic structural diagram of a receiver according to an embodiment of the present invention;

FIG. 10-B is a schematic structural diagram of another receiver according to an embodiment of the present invention;

FIG. 10-C is a schematic structural diagram of another receiver according to an embodiment of the present invention;

FIG. 10-D is a schematic structural diagram of another receiver according to an embodiment of the present invention;

FIG. 10-E is a schematic structural diagram of another receiver according to an embodiment of the present invention;

FIG. 10-F is a schematic structural diagram of a signal inverse-mapping module according to an embodiment of the present invention;

FIG. 11 is a schematic structural diagram of another transmitter according to an embodiment of the present invention.

DESCRIPTION OF EMBODIMENTS

Figure 5:
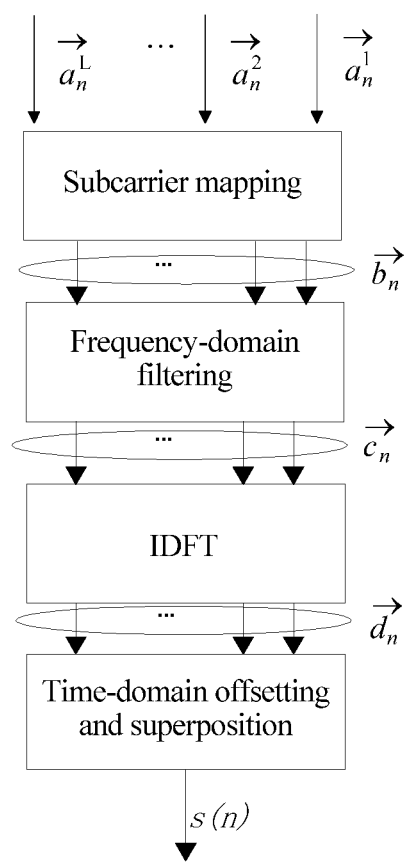
FIG. 5 is a schematic diagram of an FBMC signal transmitting method implemented by a transmitter according to an embodiment of the present invention.

Embodiments of the present invention provide an FBMC signal transmitting method and receiving method, a transmitter, and a receiver, which can effectively cancel mutual interference in a frequency-domain border.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person skilled in the art based on the embodiments of the present invention shall fall within the protection scope of the present invention.

In the specification, claims, and the foregoing drawings, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Detailed descriptions are given below.

When an FBMC signal is being transmitted, mutual interference, to difference extents, exists between adjacent subcarriers and between adjacent FBMC signals. A signal transmitted on any time-frequency resource generates an additional received signal at a position of an adjacent time-frequency resource, thereby causing interference to a wanted signal that is received. Such interference may be indicated by a transmultiplexer (English: Transmultiplexer, TMUX for short in English) response of a filter bank. The TMUX response reflects an extent to which a transmitted signal at a particular time-frequency position is spread to surrounding time-frequency positions under an ideal channel condition. Referring to the following Table 1, Table 1 is a schematic table of mutual interference generated between adjacent subcarriers of an FBMC signal and between adjacent FBMC signals. Table 1 gives an example of a typical TMUX response table, where the first column in Table 1 represents a serial number of a subcarrier, and the first row represents a serial number of an FBMC signal. In Table 1, coefficients except those in the first row and the first column are coefficients of received signals generated, by a signal transmitted at a central position (that is, a subcarrier 0 and a signal 0), at surrounding positions of corresponding subcarriers and signals. For example, it is assumed that a signal transmitted at a central position is $s_0$, and a coefficient at a position of a subcarrier i and a signal j is $a_{i,j}$; then, in a process of transmitting $s_0$, a received signal $a_{i,j} \times s_0$ is generated at the position of the subcarrier i and the signal j. If no measure is taken, the received signal $a_{i,j} \times s_0$ causes interference to receiving of a wanted signal that is transmitted at the position of the subcarrier i and the signal j. Such mutual interference is generally an inherent characteristic of an FBMC signal.

TABLE 1

| Signal Subcarrier | −4 | −3 | −2 | −1 | 0 | 1 | 2 | 3 | 4 |
|---|---|---|---|---|---|---|---|---|---|
| −1 | 0.0054 | j0.0429 | −0.1250 | −j0.2058 | 0.2393 | j0.2058 | −0.1250 | −j0.0429 | 0.0054 |
| 0 | 0 | −0.0668 | 0.0002 | 0.5644 | 1 | 0.5644 | 0.0002 | −0.0668 | 0 |
| 1 | 0.0054 | −j0.0429 | −0.1250 | j0.2058 | 0.2393 | −j0.2058 | −0.1250 | j0.0429 | 0.0054 |

In an FBMC signal processing system, a transmitted signal is a pure real number or a pure imaginary number, and is mapped onto a time-frequency resource element by using a law of real-number and imaginary-number alternation. On this precondition, it can be learned according to the interference coefficient table in Table 1 that mutual interference always occurs on an imaginary part or a real part that is corresponding to the transmitted signal. Therefore, if a channel is unchanged in a time-frequency range shown in Table 1, after channel equalization is performed, interference can be canceled by performing a simple operation of separating the real part from the imaginary part. For example, it is assumed that an OQAM symbol transmitted at a position (a subcarrier 0, a signal 0) in Table 1 is a pure real-number symbol $a_{(0,0)}$. According to a law of real-number and imaginary-number alternation, an OQAM symbol transmitted at a position (the subcarrier 0, a signal 1) is a pure imaginary number, denoted by $a_{(0,1)} \cdot j$. Specifically, interference caused by $a_{(0,0)}$ to $a_{(0,1)} \cdot j$ is used as an example, interference at another position is ignored temporarily, and interference at the another position may be analyzed by using a same method. It is assumed that the channel is unchanged in a range of Table 1 and a value of the channel is H; then, at a receiver, a received signal at the position (the subcarrier 0, the signal 1) may be represented by $y_{(0,1)} = H(a_{0,1} \cdot j + a_{0,0} \cdot 0.5644) + n$, where n represents noise. It is assumed that a zero forcing equalization algorithm is applied; then, an equalized signal is $\hat{y}_{(0,1)} = y_{(0,1)}/H = a_{0,1} \cdot j + a_{0,0} \cdot 0.5644 + n/H$. Apparently, the interference signal $a_{0,0} \cdot 0.5644$ is a pure real number, and a target received signal $a_{(0,1)} \cdot j$ is a pure imaginary number. The interference signal can be fully canceled by solving for the imaginary part of $\hat{y}_{(0,1)}$.

In an actual application, however, it can not be ensured that the channel is unchanged in the range of Table 1. If the channel significantly changes in a time or frequency dimension, mutual interference is generated between adjacent transmitted signals in a time-domain border or frequency-domain border in which the channel changes. For example, in the foregoing example, if a channel experienced by $a_{(0,0)}$ is $H_1$ and a channel experienced by $a_{(0,1)} \cdot j$ is $H_2$, the received signal changes to $y_{(0,1)} = H_2 \cdot a_{(0,1)} \cdot j + H_1 \cdot a_{0,0} \cdot 0.5644 + n$. In this case, impact of $H_1$ and impact of $H_2$ generally cannot be canceled at the same time by means of equalization. $H_1$ and $H_2$ are generally complex numbers, and therefore the interference signal cannot be canceled by using the method, in the foregoing example, of solving for the imaginary part. In a broadband multi-carrier system, a change of a channel in a frequency domain is relatively sharp, and the broadband multi-carrier system widely uses a frequency division multiple access technology, which also leads to a significant change of the channel in the frequency domain. Therefore, mutual interference in a frequency-domain border is more outstanding than an interference problem in a time-domain border. In the embodiments of the present invention, in order to cancel inherent mutual interference of an FBMC signal, an FBMC signal transmitting method and receiving method, a transmitter, and a receiver are proposed. In the following, the FBMC signal transmitting method is first described in detail.

Referring to FIG. 1, a filter bank multi-carrier (English: Filter Bank Multi-Carrier, FBMC for short in English) signal transmitting method provided in an embodiment of the present invention may specifically include the following steps:

101. Generate offset quadrature amplitude modulation (English: Offset Quadrature Amplitude Modulation, OQAM for short in English) symbols included on at least two subbands.

In this embodiment of the present invention, a subband (English: subband) refers to a segment of frequency resources formed by multiple consecutive subcarriers. Multiple OQAM symbols generated by a transmitter are carried on subbands. For a process of generating an OQAM symbol, reference may be made to the prior art, and details are not described in this embodiment of the present invention again.

In some embodiments of the present invention, when an OQAM symbol generated by the transmitter is used for uplink transmission, signals of different users experience different channels and then arrive at a receiver. From a perspective of the receiver, the channel is not constant either at a border position of time-frequency resources of different users, and therefore interference is also generated. At the receiver, mutual interference is also generated on several adjacent subcarriers of two data blocks. Therefore, in order to avoid mutual interference between different users, optionally, in some embodiments of the present invention, the transmitter generates OQAM symbols carried on a same subband for a same user. That is, OQAM symbols generated by the transmitter for a user are carried on a subband, and OQAM symbols generated for different users are carried on different subbands.

102. Map an OQAM symbol on each subband onto a respective subcarrier to obtain a frequency-domain signal. A first frequency interval exists between adjacent subcarriers in a same subband, and a second frequency interval exists between adjacent subcarriers that belong to two adjacent subbands.

The second frequency interval is a sum of the first frequency interval and a guard band interval, and the guard band interval is a fractional multiple of the first frequency interval.

In this embodiment of the present invention, after the transmitter generates the OQAM symbol, the transmitter performs subcarrier mapping on the OQAM symbol. The transmitter maps the OQAM symbol on each subband onto the respective subcarrier. After the mapping is completed, a fixed interval is maintained between the subcarriers. That is, an interval (also known as a subcarrier interval) definitely exists between two adjacent subcarriers, the first frequency interval exists between adjacent subcarriers in a same subband, and the second frequency interval exists between adjacent subcarriers that belong to two adjacent subbands. Because the second frequency interval is the sum of the first frequency interval and the guard band interval, in this embodiment of the present invention, the first frequency interval between adjacent subcarriers in a same subband is less than the second frequency interval between adjacent subcarriers that belong to two adjacent subbands. In terms of numerical values, the second frequency interval minus the first frequency interval is equal to the guard band interval.

In some embodiments of the present invention, the mapping an OQAM symbol on each subband onto a respective subcarrier in step 102 may specifically include two cases. In one case, OQAM symbols on a same subband are mapped onto subcarriers; in the other case, OQAM symbols separately carried on adjacent subbands are mapped onto subcarriers. Specifically, for OQAM symbols that belong to a same subband, the mapping an OQAM symbol on each subband onto a respective subcarrier in step 102 may include the following steps:

mapping the $n^{th}$ OQAM symbol on the $x^{th}$ subband onto the $y^{th}$ subcarrier; and mapping the $(n+1)^{th}$ OQAM symbol on the $x^{th}$ subband onto the $(y+1)^{th}$ subcarrier; where the first frequency interval $\Delta f$ exists between the $y^{th}$ subcarrier and the $(y+1)^{th}$ subcarrier, x refers to any one of the at least two subbands, n refers to any OQAM symbol on the $x^{th}$ subband, the $n^{th}$ OQAM symbol and the $(n+1)^{th}$ OQAM symbol are two adjacent OQAM symbols on the $x^{th}$ subband, and x, y, and n are positive integers.

That is, the transmitter can perform mapping on all OQAM symbols generated in step 101. For example, x is used to represent a subband on which the transmitter performs subcarrier mapping, and if OQAM symbols generated by the transmitter are carried on 4 subbands, a value of x may be 1, 2, 3, or 4; and n is used to represent any OQAM symbol on the $x^{th}$ subband, and if a total of 5 OQAM symbols are carried by the transmitter on the $x^{th}$ subband, a value of n may be 1, 2, 3, or the like, (n+1) may represent an OQAM symbol adjacent to n, and y is used to represent a subcarrier to which the $n^{th}$ OQAM symbol on the $x^{th}$ subband is mapped. That a value of x is 1 and a total of 5 OQAM symbols are carried on the first subband is used as an example. First, the first OQAM symbol on the first subband is mapped onto the $y^{th}$ subcarrier; then, the second OQAM symbol on the first subband is mapped onto the $(y+1)^{th}$ subcarrier, . . . , until the fifth OQAM symbol on the first subband is mapped onto the $(y+4)^{th}$ subcarrier. Subcarrier mapping is performed, in the manner described above, on OQAM symbols that belong to a same subband. A same interval value exists between adjacent subcarriers in a same subband, and the interval value is the first frequency interval, and may be represented by $\Delta f$.

Further, in some embodiments of the present invention, after the $n^{th}$ OQAM symbol on the $x^{th}$ subband is mapped onto the $y^{th}$ subcarrier, and the $(n+1)^{th}$ OQAM symbol on the $x^{th}$ subband is mapped onto the $(y+1)^{th}$ subcarrier, in terms of a frequency domain, that the first frequency interval $\Delta f$ exists between the $y^{th}$ subcarrier and the $(y+1)^{th}$ subcarrier is implemented in the following manner:

inserting (k−1) zeros between the $n^{th}$ OQAM symbol and the $(n+1)^{th}$ OQAM symbol, where k is an overlap factor of a prototype filter.

That is, when the transmitter performs subcarrier mapping, in a case of respectively mapping OQAM symbols that belong to a same subband onto subcarriers, the first frequency interval existing between adjacent subcarriers (that is, the $y^{th}$ subcarrier and the $(y+1)^{th}$ subcarrier) is implemented by inserting (k−1) zeros between the $n^{th}$ OQAM symbol and the $(n+1)^{th}$ OQAM symbol, where k is the overlap factor, set by the transmitter, of the prototype filter.

In some other embodiments of the present invention, for OQAM symbols that respectively belong to two subbands, the mapping an OQAM symbol on each subband onto a respective subcarrier in step 102 may specifically include the following steps:

mapping the last OQAM symbol on the $x^{th}$ subband onto the $z^{th}$ subcarrier; and mapping the first OQAM symbol on the $(x+1)^{th}$ subband onto the $(z+1)^{th}$ subcarrier; where the second frequency interval $(m+1)\Delta f$ exists between the $z^{th}$ subcarrier and the $(z+1)^{th}$ subcarrier, where $\Delta f$ represents the first frequency interval, $m\Delta f$ is the guard band interval, m is a fraction greater than 0, and both x and z are positive integers.

That is, the transmitter can separately perform mapping on all OQAM symbols generated in step 101. For example, x is used to represent a subband on which the transmitter performs subcarrier mapping, and if OQAM symbols generated by the transmitter are carried on 4 subbands, a value of x may be 1, 2, or 3; and (x+1) is used to represent a subband adjacent to x, and if the last OQAM symbol on the $x^{th}$ subband is mapped onto the $z^{th}$ subcarrier, the first OQAM symbol on the $(x+1)^{th}$ subband adjacent to the $x^{th}$ subband may be mapped onto the $(z+1)^{th}$ subcarrier. That a value of x is 1 and a total of 5 OQAM symbols are carried on the first subband is used as an example. For an implementation scenario of OQAM symbols that respectively belong to two subbands, exemplary description is as follows: The fifth OQAM symbol on the first subband is mapped onto the $z^{th}$ subcarrier, and then the first OQAM symbol on the second subband is mapped onto the $(z+1)^{th}$ subcarrier. Subcarrier mapping is performed, in the manner described above, on OQAM symbols that respectively belong to two subbands. A same interval value exists between adjacent subcarriers that respectively belong to two subbands, and the interval value is the second frequency interval, and may be represented by $(m+1)\Delta f$, where m represents a fraction greater than 0 and $m\Delta f$ may represent the guard band interval.

Further, in some embodiments of the present invention, after the last OQAM symbol on the $x^{th}$ subband is mapped onto the $z^{th}$ subcarrier, and the first OQAM symbol on the $(x+1)^{th}$ subband is mapped onto the $(z+1)^{th}$ subcarrier, in terms of a frequency domain, that the second frequency interval $(m+1)\Delta f$ exists between the $z^{th}$ subcarrier and the $(z+1)^{th}$ subcarrier is implemented in the following manner:

inserting (k+p−1) zeros between the last OQAM symbol and the first OQAM symbol, where k is an overlap factor of a prototype filter, and p is an outband suppression factor of the prototype filter.

That is, when the transmitter performs subcarrier mapping, in a case of respectively mapping OQAM symbols that respectively belong to two subbands onto subcarriers, the second frequency interval existing between adjacent subcarriers (that is, the $z^{th}$ subcarrier and the $(z+1)^{th}$ subcarrier) is implemented by inserting (k+p−1) zeros between the last OQAM symbol on the $x^{th}$ subband and the first OQAM symbol on the $(x+1)^{th}$ subband, where k is the overlap factor, set by the transmitter, of the prototype filter, and p is the outband suppression factor of the prototype filter. In the present invention, the outband suppression factor is a parameter that reflects an outband suppression effect of the prototype filter. A better outband suppression effect of the prototype filter indicates a smaller outband suppression factor; and a poorer outband suppression effect of the prototype filter indicates a larger outband suppression factor. A method for determining the outband suppression factor is as follows: After (k+p−1) zeros are inserted between two adjacent OQAM symbols and frequency-domain filtering is performed, if main parts of energy of spectrums of the two adjacent OQAM symbols do not overlap, it is considered that p is a proper outband suppression factor value.

In some embodiments of the present invention, that the first frequency interval exists between adjacent subcarriers in a same subband and the second frequency interval exists between adjacent subcarriers that belong to two adjacent subbands may also be implemented in the following manner: First, the first frequency interval is inserted between all adjacent subcarriers, that is, the first frequency interval is inserted between any two adjacent subcarriers regardless of whether the any two adjacent subcarriers are in a same subband or belong to two separate subbands; then the guard band interval is inserted between adjacent subcarriers that respectively belong to two subbands, and therefore the second frequency interval may be obtained by the guard band interval plus the first frequency interval.

That is, after the transmitter respectively maps all OQAM symbols onto subcarriers, the first frequency interval exists between all adjacent subcarriers, and then the transmitter inserts the guard band interval between adjacent subcarriers that belong to two adjacent subbands in an FBMC signal, where the guard band interval is an interval value equal to a fractional multiple of the first frequency interval. A function of the interval value is used to protect OQAM symbols on two adjacent subbands from generating mutual interference. The transmitter inserts the guard band interval between different subbands, the guard band interval can effectively isolate adjacent subbands, and by using the guard band interval, it can be implemented that spectrums of adjacent subbands do not overlap, so as to achieve approximate orthogonality. Therefore, mutual interference generated because adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

For example, the last OQAM symbol on the $x^{th}$ subband is mapped onto the $z^{th}$ subcarrier, and the first OQAM symbol on the $(x+1)^{th}$ subband is mapped onto the $(z+1)^{th}$ subcarrier. $\Delta f$ is inserted between the $z^{th}$ subcarrier and the $(z+1)^{th}$ subcarrier that respectively belong to two subbands, and then $m\Delta f$ is further inserted between the $z^{th}$ subcarrier and the $(z+1)^{th}$ subcarrier, where $m\Delta f$ is a guard band interval, and m is a fraction greater than 0.

That is, when the interval $\Delta f$ exists between the $z^{th}$ subcarrier and the $(z+1)^{th}$ subcarrier, the guard band interval inserted by the transmitter in this embodiment of the present invention is $m\Delta f$, and m is a fractional value greater than 0. In this case, it can be learned, from step 102, that for subcarriers that respectively belong to two different subbands, the $z^{th}$ subcarrier is separated from the $(z+1)^{th}$ subcarrier by $(m+1)\Delta f$. Referring to FIG. 2-A, FIG. 2-A is a schematic diagram of an implementation manner of inserting, by a transmitter, a guard band interval between adjacent subcarriers that belong to two adjacent subbands according to an embodiment of the present invention. In a time domain (t), the $x^{th}$ subband and the $(x+1)^{th}$ subband are consecutively distributed; and in a frequency domain (f), the guard band interval is inserted between the $x^{th}$ subband and the $(x+1)^{th}$ subband. It can be learned that the guard band interval inserted between different subbands can effectively isolate adjacent subbands, and therefore mutual interference generated because adjacent subbands experience different channels can be canceled by using the guard band interval.

It should be clarified that in this embodiment of the present invention, the guard band interval is a fractional multiple of the first frequency interval, where the fractional multiple refers to a fraction greater than 0, or it may be considered that the fractional multiple is a pure decimal fraction.

In this embodiment of the present invention, a value of the guard band interval is a fractional multiple of the first frequency interval. In an actual application, the guard band interval may be acquired in multiple manners. Specifically, in some embodiments of the present invention, before the mapping an OQAM symbol on each subband onto a respective subcarrier in step 102, the FBMC signal transmitting method provided in this embodiment of the present invention may further include the following step:

acquiring the guard band interval according to the overlap factor and outband suppression factor of the prototype filter, and the first frequency interval, where the guard band interval is acquired in the following manner:

$$G = \frac{P}{K}\Delta f,$$

where

G is the guard band interval, K is the overlap factor of the prototype filter, P is the outband suppression factor of the prototype filter, and $\Delta f$ is the first frequency interval.

That is, the transmitter is provided with a filter, and the transmitter may determine a value of the guard band interval according to the overlap factor and outband suppression factor of the prototype filter, and the first frequency interval. The value of the overlap factor is determined by the filter provided in the transmitter, and the outband suppression factor refers to an extent to which the filter suppresses a signal outside a passband. The transmitter may use a related parameter of the filter to determine the value of the guard band interval, provided that the transmitter in this embodiment of the present invention sets the value of the guard band interval to a fractional multiple of the first frequency interval. Based on this idea, another manner of acquiring the guard band interval may exist in this embodiment of the present invention. For example, the transmitter may preset a fractional-multiple value as the guard band interval, and after the transmitter maps all OQAM symbols onto subcarriers, the preset guard band interval may be inserted between adjacent subcarriers of adjacent subbands.

For example, in this embodiment of the present invention, the first frequency interval existing between adjacent subcarriers in a same subband (which may also be referred to as a subcarrier interval, for example, $\Delta f$) is fixed. The guard band interval (which may also be referred to as a guard interval for short) is inserted between adjacent subbands in this embodiment of the present invention, the guard interval (G) is a fractional subcarrier interval, and $$G = \frac{P}{K}\Delta f,$$

where K is a positive integer, and P is a non-negative integer. That is, after the guard interval is inserted, the interval of adjacent subcarriers of two adjacent subbands changes to $$\frac{K+P}{K}\Delta f.$$

Referring to FIG. 2-B, FIG. 2-B is a schematic diagram of an implementation manner of a comparison, according to an embodiment of the present invention, between mutual interference cancellation after a guard band interval is inserted between two adjacent subbands by a transmitter, and mutual interference cancellation before the guard band interval is inserted. In FIG. 2-B, a solid line is used to represent a spectrum of a subband 1, and a dashed line is used to represent a spectrum of a subband 2. The left half part in FIG. 2-B is a schematic diagram of overlapped spectrums with interference existent between the subband 1 and the subband 2 before the guard band interval is inserted. The right half part in FIG. 2-B is a schematic diagram of nonoverlapped spectrums with mutual interference canceled after the guard band interval is inserted. It can be implemented, by inserting a guard interval between adjacent subbands, that main parts of energy of spectrums of the adjacent subbands do not overlap, so as to achieve approximate orthogonality. In addition, if different subbands are allocated to different users, orthogonality between users can be also ensured.

In the technical field of FBMC signals, a signal is processed by using a subcarrier as a unit. Generally, a guard interval can be only an integer multiple of a subcarrier interval (for example, 1 or 2 subcarrier intervals). However, according to the method provided in this embodiment of the present invention, the guard interval may merely be a fractional multiple of the subcarrier interval (for example, ¾ of a subcarrier interval). Therefore, occupation of spectrum resources is reduced by using the fractional-multiple guard band interval.

103. Generate an FBMC signal out of the frequency-domain signal.

In this embodiment of the present invention, after the transmitter maps the OQAM symbol on each subband onto the respective subcarrier to obtain the frequency-domain signal, the frequency-domain signal has the first frequency interval between adjacent subcarriers in a same subband, and has the second frequency interval between adjacent subcarriers that belong to two adjacent subbands. After the transmitter obtains the frequency-domain signal, the transmitter generates the FBMC signal out of the frequency-domain signal.

It should be noted that in some embodiments of the present invention, the generating an FBMC signal out of the frequency-domain signal in step 103 may include the following steps:

A1. Perform frequency-domain filtering on the frequency-domain signal.

A2. Perform inverse discrete Fourier transform IDFT (English: Inverse Discrete Fourier Transform, IDFT for short in English) on the frequency-domain signal obtained after frequency-domain filtering, to obtain a time-domain signal.

A3. Perform time-domain offsetting and superposition on the time-domain signal to obtain the FBMC signal.

Specifically, for step A1, the transmitter performs frequency-domain filtering on the frequency-domain signal to acquire a frequency-domain signal obtained after frequency-domain filtering. OQAM symbols carried on multiple subbands form an FBMC signal, and each FBMC signal includes OQAM symbols carried on multiple subbands. In this embodiment of the present invention, the transmitter performs frequency-domain filtering on the frequency-domain signal, which may be specifically implemented by a filter configured in the transmitter.

In some embodiments of the present invention, the performing frequency-domain filtering on the frequency-domain signal in step A1 may specifically include the following step:

performing convolution on the frequency-domain signal and a frequency-domain response of the filter configured in the transmitter, to acquire the frequency-domain signal obtained after frequency-domain filtering.

In some embodiments of the present invention, before the performing frequency-domain filtering on the frequency-domain signal in step A1, the FBMC signal transmitting method provided in this embodiment of the present invention may further include the following step:

performing precoding on the frequency-domain signal.

In a case in which channel status information is known, the transmitter performs preprocessing, that is, precoding, on a transmitted signal at a transmit end, which can help a receiver perform signal detection.

It should be noted that in this embodiment of the present invention, a typical scenario to which an FBMC signal applies is as follows: In a multiple input multiple output (English: Multiple Input Multiple Output-Filter Bank Multi Carrier, MIMO-FBMC for short in English) system, if a precoding technology is used, a channel changes to an equivalent channel, which may be represented by a product of the channel and a precoding matrix. Because precoding is generally performed according to a particular time-frequency granularity, the equivalent channel may no longer be constant near a frequency-domain border of different precoding blocks. For example, if different precoding matrices P1 and P2 are used for a data block 1 and a data block 2, even though it may be considered that channels experienced by adjacent subcarriers of both the data block 1 and the data block 2 are H, equivalent channels on the adjacent subcarriers in a border between the two data blocks are still H*P1 and H*P2 respectively, which leads to mutual interference between the adjacent subcarriers. In this embodiment of the present invention, it can be learned, from the description in step 102, that the transmitter has a second frequency interval between adjacent subcarriers that belong to two adjacent subbands, and the second frequency interval is formed by the first frequency interval and the guard band interval. The guard band interval can effectively isolate two adjacent subbands, and by using the guard band interval, it can be implemented that spectrums of two adjacent subbands do not overlap, so as to achieve approximate orthogonality. Therefore, mutual interference generated because two adjacent subbands experience different channels can be canceled by using the guard band interval.

For step A2, after the transmitter performs frequency-domain filtering on the frequency-domain signal, the transmitter performs IDFT on the frequency-domain signal obtained after frequency-domain filtering, to obtain a time-domain signal. Further, when a value of the overlap factor of the prototype filter is an integer power of 2, the performing, by the transmitter, IDFT on the frequency-domain signal obtained after frequency-domain filtering in step A2 may specifically include the following step:

performing inverse fast Fourier transform (English: Inverse Fast Fourier Transform, IFFT for short in English) on the frequency-domain signal obtained after frequency-domain filtering, to obtain the time-domain signal.

Because generally IFFT refers in particular to a base-2 fast Fourier transform, if the value of the overlap factor is not an integer power of 2, zeros may be added in the frequency-domain signal so that the value of the overlap factor meets a requirement of an integer power of 2. In this case, IFFT can also be performed.

For step A3, after the transmitter performs IDFT on the frequency-domain signal, the transmitter performs time-domain offsetting and superposition on the time-domain signal to obtain an FBMC signal. The FBMC signal needs to be transmitted by the transmitter to the receiver. Further, step A3 may specifically include the following steps:

performing time-domain offsetting on the time-domain signal at an offset interval of T/2K, where T is a data length of an FBMC time-domain signal, and K is the overlap factor of the prototype filter; and performing superposition on offset time-domain signals to obtain the FBMC signal.

In an actual application, the offset interval may be T/2K. Certainly, the transmitter may also set a value of the offset interval flexibly according to a specific application scenario. After offsetting all time-domain signals is completed, the transmitter performs superposition on offset time-domain signals, so that a time-domain FBMC signal that is offset and superposed can be obtained.

104. Transmit the FBMC signal to a receiver.

In this embodiment of the present invention, after the transmitter completes offsetting and superposition for the FBMC signal, the transmitter transmits the FBMC signal to the receiver, and the receiver receives and parses the signal.

In an actual application, for a process of processing an uplink FBMC signal, the transmitter may be specifically a terminal, and the receiver may be specifically a base station, that is, the terminal transmits a generated FBMC signal to the base station. In addition, for a process of processing a downlink FBMC signal, the transmitter may be specifically a base station, and the receiver may be specifically a terminal, that is, the base station transmits a generated FBMC signal to the terminal.

It can be learned, from the description about the foregoing embodiment of the present invention, that after generating OQAM symbols included on at least two subbands, a transmitter maps an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval; then generates an FBMC signal out of the frequency-domain signal; and finally, transmits the FBMC signal to a receiver. The transmitter generates a second frequency interval between adjacent subcarriers of two adjacent subbands; therefore, compared with a first frequency interval between adjacent subcarriers in a same subband, the second frequency interval is a sum of the first frequency interval and a guard band interval, and the guard band interval can implement effective isolation between subcarriers of adjacent subbands. By using the guard band interval, it can be implemented that spectrums of adjacent subbands do not overlap, so as to achieve approximate orthogonality. Therefore, mutual interference generated because adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

In the foregoing embodiments, the FBMC signal transmitting method provided in the embodiments of the present invention is described from a perspective of a transmitter side. In the following, an FBMC signal receiving method provided in an embodiment of the present invention is described, and is implemented by a receiver. Referring to FIG. 3, the method may mainly include the following steps:

301. Receive an FBMC signal.

In this embodiment of the present invention, after a transmitter transmits the FBMC signal, the receiver can normally receive the FBMC signal.

302. Use the received FBMC signal to obtain a frequency-domain signal.

In this embodiment of the present invention, after the receiver receives the FBMC signal, the receiver uses the received FBMC signal to obtain the frequency-domain signal.

Specifically, that the receiver uses the received FBMC signal to obtain the frequency-domain signal may specifically include the following steps:

B1. Perform time-domain symbol extraction on the received FBMC signal to obtain a time-domain signal.

B2. Perform discrete Fourier transform (English: Discrete Fourier Transform, DFT for short in English) on the time-domain signal obtained by time-domain symbol extraction, to obtain a DFT-transformed signal.

B3. Perform frequency-domain filtering on the DFT-transformed signal to obtain the frequency-domain signal.

For step B1, the receiver first performs time-domain symbol extraction on the received FBMC signal to obtain the time-domain signal. Further, the performing time-domain symbol extraction on the received FBMC signal to obtain a time-domain signal in step B1 may specifically include the following step:

performing time-domain symbol extraction on the received FBMC signal at an offset interval of T/2K, where T is a data length of a time-domain signal, and K is an overlap factor of a prototype filter.

That is, when performing time-domain symbol extraction on the FBMC signal transmitted by the transmitter, the receiver may perform extraction at an offset interval set by the transmitter; then, T/2K delays exist between the two extracted FBMC signals.

For step B2, the receiver performs DFT on the time-domain signal obtained by time-domain symbol extraction, to obtain the DFT-transformed signal, so as to implement restoration of the FBMC signal from a time domain to a frequency domain.

It should be noted that in some embodiments of the present invention, when a value of the overlap factor is an integer power of 2, the performing DFT on the time-domain signal obtained by time-domain symbol extraction in step B2 may specifically include the following step:

performing fast Fourier transform (English: Fast Fourier Transform, FFT for short in English) on the time-domain signal obtained by time-domain symbol extraction.

Because generally FFT refers in particular to a base-2 fast Fourier transform, if the value of the overlap factor is not an integer power of 2, and if IFFT is used because the transmitter adds zeros in the FBMC frequency-domain signal so that the value of the overlap factor meets a requirement of an integer power of 2, in this case, the receiver may also perform FFT with a quantity of points the same as that of IFFT performed by the transmitter.

For step B3, in this embodiment of the present invention, after the receiver performs DFT on the FBMC signal, the receiver further needs to perform frequency-domain filtering on the DFT-transformed FBMC signal to obtain the frequency-domain signal, where the frequency-domain filtering may be specifically implemented by using a filter configured in the receiver.

Further, the performing frequency-domain filtering on the DFT-transformed signal to obtain the frequency-domain signal in step B3 may specifically include the following step:

performing convolution on the DFT-transformed signal and a conjugate of a frequency response of a filter provided in the transmitter to obtain the frequency-domain signal.

The filter provided in the receiver is mutually conjugate with the filter provided in the transmitter in terms of coefficients, and the receiver can generate the frequency-domain signal by means of frequency-domain filtering by the filter.

In some embodiments of the present invention, before the performing frequency-domain filtering on the DFT-transformed signal to obtain the frequency-domain signal in step B3, the FBMC signal receiving method provided in this embodiment of the present invention may further include the following step:

performing channel equalization on the DFT-transformed signal.

Specifically, channel equalization may be implemented by using an equalizer configured in the receiver. For a fading channel, the equalizer serves as a tunable filter, and can rectify and compensate for channel fading to reduce impact of intersymbol interference.

Specifically, the performing channel equalization on the DFT-transformed signal may specifically include the following step:

multiplying the DFT-transformed signal by a coefficient of the equalizer to acquire a time-domain signal obtained after channel equalization, where the coefficient of the equalizer is a reciprocal of a channel frequency response of the receiver.

303. Perform inverse mapping on the frequency-domain signal according to a first frequency interval and a second frequency interval to obtain quadrature amplitude modulation OQAM symbols carried on at least two subbands, where the first frequency interval is a frequency interval existing between adjacent subcarriers in a same subband, and the second frequency interval is a frequency interval existing between adjacent subcarriers that belong to two adjacent subbands.

The second frequency interval is a sum of the first frequency interval and a guard band interval, and the guard band interval is a fractional multiple of the first frequency interval.

It should be noted that in some embodiments of the present invention, if the transmitter performs downlink data transmission, after the using the received FBMC signal to obtain a frequency-domain signal in step 302, the FBMC signal transmitting method provided in this embodiment of the present invention may further include the following step:

screening out, from the frequency-domain signal, a frequency-domain signal mapped onto a preset subcarrier.

In such an application scenario, the performing inverse mapping on the frequency-domain signal according to a first frequency interval and a second frequency interval in step 303 may specifically include the following step:

performing, according to the first frequency interval and the second frequency interval, inverse mapping on the frequency-domain signal mapped onto the preset subcarrier.

If the transmitter performs downlink data transmission, for an MIMO-FBMC system, a downlink FBMC signal transmitted by the transmitter may not be transmitted to only one user. Then, after the receiver uses the received FBMC signal to obtain the frequency-domain signal, the receiver may perform inverse mapping on only a particular subcarrier or some particular subcarriers without performing inverse mapping on all subcarriers. For example, for a case in which the transmitter performs downlink signal transmission, the receiver only needs to extract data on a subcarrier scheduled to the receiver itself, and does not need to perform subsequent processing on data on all subcarriers. However, if the transmitter performs uplink signal transmission, the receiver needs to extract data on all wanted subcarriers for subsequent processing. Specifically, the receiver may perform screening on frequency-domain signals, and screen out, from all frequency-domain signals, the frequency-domain signal mapped onto the preset subcarrier.

In this embodiment of the present invention, the receiver performs inverse mapping on the frequency-domain signal in an inverse manner of mapping performed by the transmitter. That is, the receiver may extract data from the frequency-domain signal according to the first frequency interval and the second frequency interval, and use the data as a result of the inverse mapping. Because the transmitter uses two types of intervals when performing mapping on the frequency-domain signal (that is, the first frequency interval used for adjacent subcarriers in a same subband, and the second frequency interval used for adjacent subcarriers that belong to two adjacent subbands), the receiver may extract, when performing signal restoration, the data according to the foregoing first frequency interval and second frequency interval, to obtain the OQAM signals carried on the at least two subbands.

In this embodiment of the present invention, when a receiver performs inverse mapping, for adjacent subcarriers in each subband, OQAM symbols can be extracted according to a first frequency interval; for adjacent subcarriers that respectively belong to two subbands, because a transmitter inserts a second frequency interval between the adjacent subcarriers that respectively belong to two subbands, where the second frequency interval is a sum of the first frequency interval and a guard band interval, when performing inverse mapping, the receiver also needs to restore the OQAM symbols according to the second frequency interval inserted by the transmitter. Because the transmitter inserts a guard band interval between adjacent subcarriers that belong to two adjacent subbands, and the guard band interval can effectively isolate the two adjacent subbands, by using the guard band interval, it can be implemented that spectrums of the two adjacent subbands do not overlap, so as to achieve approximate orthogonality. Therefore, mutual interference generated because the two adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

In some embodiments of the present invention, after the performing inverse mapping on the frequency-domain signal according to a first frequency interval and a second frequency interval to obtain quadrature amplitude modulation OQAM symbols carried on at least two subbands in step 303, the FBMC signal receiving method provided in this embodiment of the present invention may further include the following step:

performing channel equalization on the OQAM symbols.

Specifically, channel equalization may be implemented by using an equalizer configured in the receiver. For a fading channel, the equalizer serves as a tunable filter, and can rectify and compensate for channel fading to reduce impact of intersymbol interference.

Specifically, the performing channel equalization on the OQAM symbols may include the following step:

multiplying the OQAM symbols by a coefficient of the equalizer to acquire OQAM symbols obtained after channel equalization, where the coefficient of the equalizer is a reciprocal of a channel frequency response of the receiver.

It can be learned, from the foregoing content description, that in this embodiment of the present invention, the channel equalization performed by the receiver on the FBMC signal may be completed before frequency-domain filtering, or may be completed after the inverse mapping is performed on the frequency-domain signal according to the first frequency interval and the second frequency interval, which may specifically depend on a specific application scenario.

In some embodiments of the present invention, the performing inverse mapping on the frequency-domain signal according to a first frequency interval and a second frequency interval to obtain quadrature amplitude modulation OQAM symbols carried on at least two subbands in step 303 may specifically include the following steps:

C1. Extract, from the $x^{th}$ subband of the frequency-domain signal according to the second frequency interval, the first OQAM symbol carried on the $x^{th}$ subband.

C2. After the first OQAM symbol carried on the $x^{th}$ subband is extracted, successively extract, from the $x^{th}$ subband of the frequency-domain signal according to the first frequency interval, the second OQAM symbol to the last OQAM symbol carried on the $x^{th}$ subband.

C3. Extract, according to the second frequency interval, the first OQAM symbol carried on the $(x+1)^{th}$ subband from the $(x+1)^{th}$ subband of the frequency-domain signal.

x refers to any subband in the frequency-domain signal.

Specifically, for step C1, the first subcarrier of the $x^{th}$ subband and the last subcarrier of the $(x-1)^{th}$ subband are adjacent subcarriers that respectively belong to two subbands, and are separated by the second frequency interval. Therefore, the first OQAM symbol carried on the $x^{th}$ subband can be extracted from the $x^{th}$ subband of the frequency-domain signal according to the second frequency interval.

For step C2, the second subcarrier of the $x^{th}$ subband is separated from the third subcarrier of the $x^{th}$ subband by the first frequency interval, and the third subcarrier of the $x^{th}$ subband is also separated from the fourth subcarrier of the $x^{th}$ subband by the first frequency interval. Therefore, the second OQAM symbol to the last OQAM symbol carried on the $x^{th}$ subband can be extracted from the $x^{th}$ subband of the frequency-domain signal according to the first frequency interval. For step C3, the first subcarrier of the $(x+1)^{th}$ subband and the last subcarrier of the $x^{th}$ subband are adjacent subcarriers that respectively belong to two subbands, and are separated by the second frequency interval. Therefore, the first OQAM symbol carried on the $(x+1)^{th}$ subband can be extracted from the $(x+1)^{th}$ subband of the frequency-domain signal according to the second frequency interval. Complete OQAM symbols can be extracted from the frequency-domain signal in the manner described above.

It can be learned, from the description about the foregoing embodiment of the present invention, that after receiving an FBMC symbol from a transmitter, a receiver uses the received FBMC signal to obtain a frequency-domain signal, and finally, performs inverse mapping on the frequency-domain signal according to a first frequency interval and a second frequency interval to obtain OQAM symbols carried on at least two subbands, where the first frequency interval exists between adjacent subcarriers in a same subband, the second frequency interval exists between adjacent subcarriers that belong to two adjacent subbands, the second frequency interval is a sum of the first frequency interval and a guard band interval, and the guard band interval is a fractional multiple of the first frequency interval. Because the transmitter generates a second frequency interval between adjacent subcarriers of two adjacent subbands and generates a first frequency interval between adjacent subcarriers in a same subband, the receiver needs to perform inverse mapping on the frequency-domain signal according to the first frequency interval and the second frequency interval, so that the OQAM symbols generated by the transmitter can be restored. Compared with a first frequency interval between adjacent subcarriers in a same subband, a second frequency interval is a sum of the first frequency interval and a guard band interval, and the guard band interval can implement effective isolation between subcarriers of adjacent subbands. By using the guard band interval, it can be implemented that spectrums of adjacent subbands do not overlap, so as to achieve approximate orthogonality. Therefore, mutual interference generated because adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

To better understand and implement the foregoing solutions in this embodiment of the present invention, the following uses a corresponding application scenario as an example for detailed description.

To implement the fractional-multiple guard band interval, a filter that meets the following requirements may be configured in this embodiment of the present invention:

(1) A prototype filter has a relatively narrow frequency-domain transition band, where the transition band refers to a spectrum interval from a center of a frequency-domain response of the filter to a frequency-domain response that approaches 0. An indicator for determining whether 0 is approached is checking whether relatively great impact is caused on transmission performance. For example, a frequency-domain response of less than −30 dB is considered to be approaching 0 because a signal to interference plus noise ratio of a radio communications system is generally less than 30 dB.

(2) The prototype filter provides high real-valued orthogonality under OQAM modulation.

Such a filter can be implemented by using existing filter design and optimization technologies. Referring to FIG. 4-A and FIG. 4-B, FIG. 4-A and FIG. 4-B are schematic diagrams of time-domain and spectrum characteristics of a filter according to an embodiment of the present invention. FIG. 4-A and FIG. 4-B give a prototype filter that meets the foregoing two conditions, and the prototype filter is obtained by optimizing a raised cosine filter whose roll-off factor $\alpha=0.125$, where an overlap factor is 8.

Referring to FIG. 5, FIG. 5 is a schematic diagram of an FBMC signal transmitting method implemented by a transmitter according to an embodiment of the present invention, where the method mainly includes the following steps:

An overlap factor of a prototype filter provided in the transmitter is K, and a quantity of frequency-domain subcarriers is M. The specific implementation method of the transmitter is described in the following steps:

S1. Generation of OQAM Symbols Included on at Least Two Subbands

It is assumed that a generated OQAM symbol includes L subbands, where L is greater than or equal to 2. Herein $\vec{a}_n^{r_1}$, $\vec{a}_n^{r_2}, \ldots, \vec{a}_n^{r_L}$ are used to represent a vector formed by OQAM symbols on L subbands that are used to generate the $n^{th}$ FBMC signal, where $\vec{a}_n^{r_1} = [a_{n,0}{}^1, a_{n,1}{}^1, L, a_{n,N_1-1}{}^1]^T$, $\vec{a}_n^{r_2} = [a_{n,0}{}^2, a_{n,1}{}^2, L, a_{n,N_2-1}{}^2]^T, \ldots, \vec{a}_n^{r_L} = [a_{n,0}{}^L, a_{n,1}{}^L, L, a_{n,N_L-1}{}^L]^T$, where $N_1, N_2, \ldots, N_L$ are positive integers and represent a quantity of subcarriers in each subband, and $N_1+N_2+L+N_L = N \leq M$. n represents a serial number of an FBMC signal, N represents a total quantity of wanted subcarriers, and is numerically not greater than a total quantity M of subcarriers, and $a_{n,z}{}^i$ represents data that is of the $z^{th}$ subcarrier of the $i^{th}$ subband and used to generate the $n^{th}$ FBMC signal.

S2. Subcarrier Mapping

A function of subcarrier mapping is mapping the OQAM symbols on the foregoing L subbands onto subcarriers (a vector $\vec{b}_n$ is used to represent data on all mapped subcarriers). It is assumed that an original interval $\Delta f$ between two subcarriers is 1 interval unit, and a fractional-multiple guard band interval is inserted between the subbands.

A rule of mapping performed by the transmitter is as follows:

(1) For subcarrier mapping in the $i^{th}$ subband, if $a_{n,0}{}^i$ is mapped onto $b_{n,j}$, $a_{n,1}{}^i$ is mapped onto $b_{n,j+K}$, and so on. That is, a fixed interval that is the overlap factor K, is maintained between mapped subcarriers.

(2) For a border position of adjacent subbands, to avoid occurrence of interference, a frequency interval between the last subcarrier of a previous subband and the first subcarrier of a next subband is set to K+P, where P is a non-negative integer. That is, if the last subcarrier of the $i^{th}$ subband is mapped onto $b_{n,j}$, the $0^{th}$ subcarrier of the $(i+1)^{th}$ subband is mapped onto $b_{n,j+K+P}$.

Figure 6:
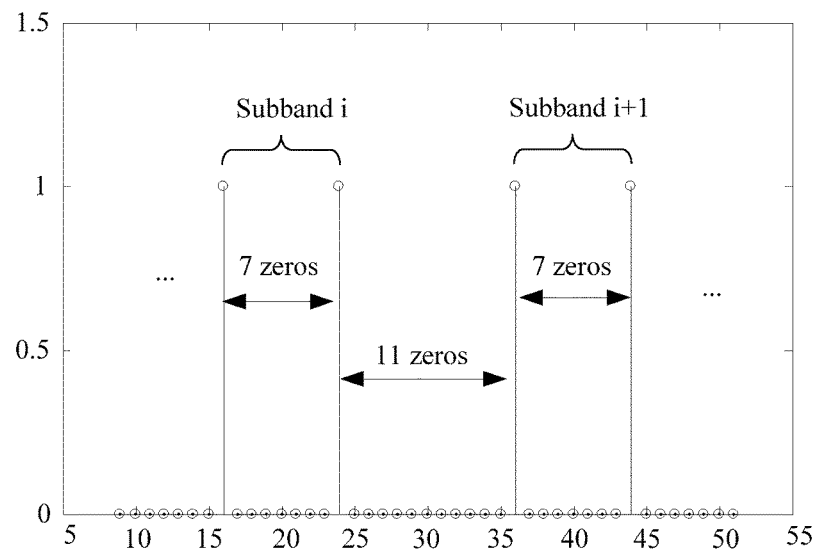
FIG. 6 is a schematic diagram of an application scenario of inserting a guard band interval between adjacent subbands according to an embodiment of the present invention.

It is assumed that the overlap factor K of the filter is 8, and P is 4. Referring to FIG. 6, FIG. 6 is a schematic diagram of an application scenario of inserting a guard band interval between adjacent subbands according to an embodiment of the present invention. FIG. 6 gives a result of subcarrier mapping at a border position of a subband i and a subband i+1. (K−1) zeros are inserted between two adjacent subcarriers in a same subband, and (K+P−1) zeros are inserted between two subbands.

S3. Frequency-domain Filtering

A function of frequency-domain filtering is performing a filtering operation on a frequency of a mapped data block $\overset{\scriptscriptstyle 1}{b}_n$. Frequency-domain filtering may be implemented by performing convolution on $\overset{\scriptscriptstyle 1}{b}_n$ and a frequency response $\overset{\scriptscriptstyle 1}{H}$ of the filter as follows:

$\vec{c}_x = \vec{b}_x \odot \vec{H}$, where the symbol $\odot$ is a convolution calculation operator; and $\overset{\scriptscriptstyle 1}{H}$ is a frequency response of the prototype filter, whose length is generally KM. However, for a filter with relatively high frequency-domain localization, a coefficient with relatively low power may be removed from the frequency response, so that the length of the frequency response of the filter is less than KM, thereby reducing calculation complexity.

S4. IDFT

T-point IDFT transform is performed on data $\overset{\scriptscriptstyle r}{c}_n$ to obtain $\overset{\scriptscriptstyle 1}{d}_n$, where T is a value not less than KM, that is, T≥KM. If T is greater than KM, zeros may be inserted on both sides of $\overset{\scriptscriptstyle r}{c}_n$ to make up T points, and then IDFT is performed. Apparently, a length of IDFT-transformed $\overset{\scriptscriptstyle 1}{d}_n$ is T sampling points.

If a value of T is an integer power of 2, base-2 inverse fast Fourier transform, that is, IFFT transform, may be performed.

S5. Time-Domain Offsetting and Superposition

Then, parallel-serial conversion is performed. After the parallel-serial conversion, T-point data corresponding to the $(n+1)^{th}$ real-number symbol is T/2K points later than T-point data corresponding to the $n^{th}$ real-number symbol. All real-number symbols are offset and then superposed, parallel data changes to a serial data stream, and then the transmitter transmits the FBMC signal to a receiver.

Figure 7:
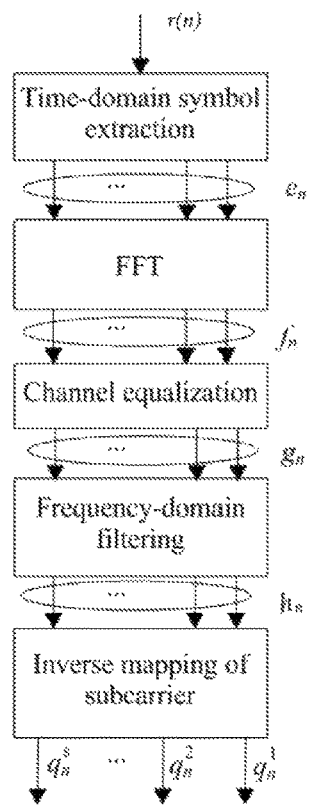
FIG. 7 is a schematic diagram of an FBMC signal receiving method implemented by a receiver according to an embodiment of the present invention.

For the receiver, there may be two FBMC signal receiving methods, which differ mainly in a position of an equalizer. Referring to FIG. 7, FIG. 7 is a schematic diagram of an FBMC signal receiving method implemented by a receiver according to an embodiment of the present invention, where the method mainly includes the following steps:

S1. Time-domain Symbol Extraction from a Received Signal

Extract a time-domain symbol of the $n^{th}$ FBMC signal to obtain $\overset{\scriptscriptstyle r}{e}_n$, where $\overset{\scriptscriptstyle r}{e}_n$ is a vector whose length is T. T-point data of $\overset{\scriptscriptstyle r}{e}_{n+1}$ is T/2K points later than T-point data of $\overset{\scriptscriptstyle r}{e}_n$.

S2. DFT

A T-point DFT operation is performed on $\overset{\scriptscriptstyle r}{e}_n$ to obtain $\overset{\scriptscriptstyle 1}{f}_n$. Because T≥KM, if T>KM, redundant zeros on both sides of $\overset{\scriptscriptstyle 1}{f}_n$ are removed according to a law of padding zeros at a transmitter end, so as to obtain valid data $\overset{\scriptscriptstyle 1}{f}_n$ whose length is KM.

Step 3. Channel Equalization

During equalization, if a channel frequency response is C(i), a coefficient of an equalizer is:

$$EQ(i) = \frac{1}{C(i)}, 0 \le i \le KM - 1$$

Therefore, a signal obtained after channel equalization is: $g_{n,i} = f_{n,i} \times EQ(i)$, 0≤i≤KM−1, where $f_{n,i}$ is the $i^{th}$ element of $\overset{\scriptscriptstyle 1}{f}_n$, and $g_{n,i}$ is the $i^{th}$ element of $\overset{\scriptscriptstyle r}{g}_n$.

S4. Frequency-domain Filtering

Frequency-domain filtering is a filtering operation that matches frequency-domain filtering performed by a transmitter, and may be implemented by convolution. A specific implementation method is performing a convolution operation on $\overset{\scriptscriptstyle r}{g}_n$ and $\overset{\scriptscriptstyle 1}{H}$, that is, $\vec{h}_n = \vec{g}_x \odot \vec{H}'$, where $\overset{\scriptscriptstyle 1}{H}'$ is a conjugate of $\overset{\scriptscriptstyle 1}{H}$, and the symbol $\odot$ represents convolution.

S5. Inverse Mapping of Subcarriers

Inverse mapping of subcarriers is corresponding to a subcarrier mapping module of the transmitter. After inverse mapping, to-be-detected data $\overset{\scriptscriptstyle r}{s}_n^1$, $\overset{\scriptscriptstyle r}{s}_n^2$, ..., $\overset{\scriptscriptstyle r}{s}_n^L$ corresponding to transmitted data $\overset{\scriptscriptstyle r}{d}_n^1$, $\overset{\scriptscriptstyle r}{d}_n^2$, ..., $\overset{\scriptscriptstyle r}{d}_n^L$ a transmit end is obtained, where $\overset{\scriptscriptstyle r}{s}_n^1$ is a to-be-detected value corresponding to $\overset{\scriptscriptstyle r}{d}_n^1$. $\overset{\scriptscriptstyle r}{s}_n^i = \overset{\scriptscriptstyle r}{d}_n^i + \overset{\scriptscriptstyle 1}{w}_n$, where $\overset{\scriptscriptstyle 1}{w}_n$ is a noise vector. As shown in FIG. 7, after performing inverse mapping, the receiver outputs a result $q_n^1$, $q_n^2$, ..., $q_n^S$. Inverse mapping of subcarriers is an inverse process of subcarrier mapping at the transmit end, and a specific method for inverse mapping of subcarriers is as follows:

(1) For data in the $i^{th}$ subband, a value is extracted at an interval of K positions and is used as a result of inverse mapping. For example, if $h_{n,j}$ is inversely mapped onto $s_{n,l}^i$, $h_{n,j+K}$ is inversely mapped onto $s_{n,l+1}^i$, where $s_{n,l}^i$ is the $l^{th}$ element of $\overset{\scriptscriptstyle 1}{w}_n$, and $h_{n,j}$ is the $j^{th}$ element of $\overset{\scriptscriptstyle 1}{h}_n$.

(2) For a border position of adjacent subbands, when subcarrier mapping is performed at the transmit end, a frequency interval between the last subcarrier of a previous subband and the first subcarrier of a next subband is K+P. Therefore, when inverse mapping of subcarriers is performed at a receive end, a frequency interval between two border subcarriers of two adjacent subbands is K+P. That is, if $h_{n,j}$ is inversely mapped onto the last subcarrier of a subband i, $h_{n,j+P+K}$ is inversely mapped onto the first subcarrier of the $(i+1)^{th}$ subband.

It should be pointed out that if a downlink signal is transmitted, the receiver only needs to extract data on a subcarrier scheduled to the receiver itself, and does not need to perform subsequent processing on data on all subcarriers. If an uplink signal is transmitted, the receiver needs to extract data on all wanted subcarriers for subsequent processing.

In some embodiments of the present invention, after generating OQAM symbols, the receiver may further perform OQAM data demodulation. For processing processes such as OQAM data demodulation and decoding, refer to the prior art.

After the foregoing operations are performed, an FBMC system that inserts a fractional-multiple guard band interval is implemented.

Referring to FIG. 8, FIG. 8 is a schematic diagram of another FBMC signal receiving method implemented by a receiver according to an embodiment of the present invention, and a difference from FIG. 7 lies in that equalization is performed after subcarrier mapping. Equalization is implemented in a manner the same as that in S3, and a difference lies in that an equalization operation needs to be performed on a maximum of KM pieces of data in FIG. 7, and an equalization operation needs to be performed on a maximum of only M pieces of data in FIG. 8.

In this embodiment of the present invention, a guard band interval is inserted between different subbands of an FBMC system to cancel interference between adjacent subbands. A width of the guard band interval can be a fractional multiple of a subcarrier interval, thereby saving spectrum resources.

It should be noted that, for ease of description, each of the foregoing method embodiments is described as a combination of a series of actions; however, a person skilled in the art should understand that, the present invention is not limited by the described action sequence, because some steps may be performed in another sequence or simultaneously according to the present invention. In addition, a person skilled in the art should also understand that all the embodiments described in this specification belong to exemplary embodiments, and the involved actions and modules are not necessarily mandatory to the present invention.

For ease of implementing the foregoing solutions according to the embodiments of the present invention, the following further provides related apparatuses for implementing the foregoing solutions.

Referring to FIG. 9-A, a transmitter 900 provided in an embodiment of the present invention may include: a symbol generation module 901, a symbol mapping module 902, a signal generation module 903, and a transmitting module 904.

The symbol generation module 901 is configured to generate offset quadrature amplitude modulation OQAM symbols included on at least two subbands.

The symbol mapping module 902 is configured to map an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval.

The signal generation module 903 is configured to generate an FBMC signal out of the frequency-domain signal.

The transmitting module 904 is configured to transmit the FBMC signal to a receiver.

In some embodiments of the present invention, for OQAM symbols that belong to a same subband, the symbol mapping module 902 is specifically configured to: map the $n^{th}$ OQAM symbol on the $x^{th}$ subband onto the $y^{th}$ subcarrier; and map the $(n+1)^{th}$ OQAM symbol on the $x^{th}$ subband onto the $(y+1)^{th}$ subcarrier; where the first frequency interval $\Delta f$ exists between the $y^{th}$ subcarrier and the $(y+1)^{th}$ subcarrier, x refers to any one of the at least two subbands, n refers to any OQAM symbol on the $x^{th}$ subband, the $n^{th}$ OQAM symbol and the $(n+1)^{th}$ OQAM symbol are two adjacent OQAM symbols on the $x^{th}$ subband, and x, y, and n are positive integers.

Further, after the mapping the $n^{th}$ OQAM symbol on the $x^{th}$ subband onto the $y^{th}$ subcarrier and the mapping the $(n+1)^{th}$ OQAM symbol on the $x^{th}$ subband onto the $(y+1)^{th}$ subcarrier, that the first frequency interval $\Delta f$ exists between the $y^{th}$ subcarrier and the $(y+1)^{th}$ subcarrier is implemented in the following manner:

inserting (k−1) zeros between the $n^{th}$ OQAM symbol and the $(n+1)^{th}$ OQAM symbol, where k is an overlap factor of a prototype filter.

In some embodiments of the present invention, for OQAM symbols that respectively belong to two subbands, the symbol mapping module 902 is specifically configured to: map the last OQAM symbol on the $x^{th}$ subband onto the $z^{th}$ subcarrier; and map the first OQAM symbol on the $(x+1)^{th}$ subband onto the $(z+1)^{th}$ subcarrier; where the second frequency interval $(m+1)\Delta f$ exists between the $z^{th}$ subcarrier and the $(z+1)^{th}$ subcarrier, where $\Delta f$ represents the first frequency interval, $m\Delta f$ is the guard band interval, m is a fraction greater than 0, and both x and z are positive integers.

Further, after the mapping the last OQAM symbol on the $x^{th}$ subband onto the $z^{th}$ subcarrier and the mapping the first OQAM symbol on the $(x+1)^{th}$ subband onto the $(z+1)^{th}$ subcarrier, that the second frequency interval $(m+1)\Delta f$ exists between the $z^{th}$ subcarrier and the $(z+1)^{th}$ subcarrier is implemented in the following manner:

inserting (k+p−1) zeros between the last OQAM symbol and the first OQAM symbol, where k is an overlap factor of a prototype filter, and p is an outband suppression factor of the prototype filter.

In some embodiments of the present invention, referring to FIG. 9-B, the transmitter 900 further includes: a guard band interval acquiring module 905, where the guard band interval acquiring module 905 is configured to: before the symbol mapping module maps the OQAM symbol on each subband onto the respective subcarrier, acquire the guard band interval according to the overlap factor and outband suppression factor of the prototype filter, and the first frequency interval, where the guard band interval is acquired in the following manner:

$$G = \frac{P}{K}\Delta f,$$

where

G is the guard band interval, K is the overlap factor of the prototype filter, P is the outband suppression factor of the prototype filter, and $\Delta f$ is the first frequency interval.

In some embodiments of the present invention, referring to FIG. 9-C, the transmitter 900, compared with the transmitter 900 shown in FIG. 9-A, further includes: a precoding module 906, configured to: before the signal generation module 903 generates the FBMC signal out of the frequency-domain signal, perform precoding on the OQAM symbol on each subband in the frequency-domain signal.

In some embodiments of the present invention, the symbol generation module 901 is specifically configured to generate OQAM symbols carried on a same subband for a same user.

In some embodiments of the present invention, referring to FIG. 9-D, the signal generation module 903 includes:

a filter 9031, configured to perform frequency-domain filtering on the frequency-domain signal;

an inverse discrete Fourier transform module 9032, configured to perform inverse discrete Fourier transform IDFT on the frequency-domain signal obtained after frequency-domain filtering, to obtain a time-domain signal; and an offsetting and superposition module 9033, configured to perform time-domain offsetting and superposition on the time-domain signal to obtain the FBMC signal.

It can be learned, from the description about the foregoing embodiment of the present invention, that after generating OQAM symbols included on at least two subbands, a transmitter maps an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval; then generates an FBMC signal out of the frequency-domain signal; and finally, transmits the FBMC signal to a receiver. The transmitter generates a second frequency interval between adjacent subcarriers of two adjacent subbands; therefore, compared with a first frequency interval between adjacent subcarriers in a same subband, the second frequency interval is a sum of the first frequency interval and a guard band interval, and the guard band interval can implement effective isolation between subcarriers of adjacent subbands. By using the guard band interval, it can be implemented that spectrums of adjacent subbands do not overlap, so as to achieve approximate orthogonality. Therefore, mutual interference generated because adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

Referring to FIG. 10-A, a receiver 1000 provided in an embodiment of the present invention may include: a signal receiving module 1001, a frequency-domain signal acquiring module 1002, and a signal inverse-mapping module 1003.

The signal receiving module 1001 is configured to receive an FBMC signal.

The frequency-domain signal acquiring module 1002 is configured to use the received FBMC signal to obtain a frequency-domain signal.

The signal inverse-mapping module 1003 is configured to perform inverse mapping on the frequency-domain signal according to a first frequency interval and a second frequency interval to obtain quadrature amplitude modulation OQAM symbols carried on at least two subbands, where the first frequency interval is a frequency interval existing between adjacent subcarriers in a same subband, the second frequency interval is a frequency interval existing between adjacent subcarriers that belong to two adjacent subbands, the second frequency interval is a sum of the first frequency interval and a guard band interval, and the guard band interval is a fractional multiple of the first frequency interval.

In some embodiments of the present invention, referring to FIG. 10-B, the frequency-domain signal acquiring module 1002 includes:

a time-domain signal extraction submodule 10021, configured to perform time-domain symbol extraction on the received FBMC signal to obtain a time-domain signal;

a discrete Fourier transform submodule 10022, configured to perform discrete Fourier transform DFT on the time-domain signal obtained by time-domain symbol extraction, to obtain a DFT-transformed signal; and a filter 10023, configured to perform frequency-domain filtering on the DFT-transformed signal to obtain the frequency-domain signal.

Further, referring to FIG. 10-C, the frequency-domain signal acquiring module 1002 further includes:

a first equalizer 10024, configured to perform channel equalization on the DFT-transformed signal before the filter 10023 performs frequency-domain filtering on the DFT-transformed signal.

In some embodiments of the present invention, referring to FIG. 10-D, compared with the receiver shown in FIG. 10-A, if the received FBMC signal is a downlink signal, the receiver 1000 may further include:

a frequency-domain signal screening module 1004, configured to: after the frequency-domain signal acquiring module uses the received FBMC signal to obtain the frequency-domain signal, screen out, from the frequency-domain signal, a frequency-domain signal mapped onto a preset subcarrier.

In this application scenario, the signal inverse-mapping module 1003 is specifically configured to perform, according to the first frequency interval and the second frequency interval, inverse mapping on the frequency-domain signal mapped onto the preset subcarrier.

In some embodiments of the present invention, referring to FIG. 10-E, compared with the receiver shown in FIG. 10-A, the receiver 1000 further includes: a second equalizer 1005, configured to perform channel equalization on the OQAM symbols after the signal inverse-mapping module 1003 performs inverse mapping on the frequency-domain signal according to the first frequency interval and the second frequency interval to obtain the quadrature amplitude modulation OQAM symbols carried on the at least two subbands.

In some embodiments of the present invention, referring to FIG. 10-F, the signal inverse-mapping module 1003 may specifically include:

a first inverse-mapping submodule 10031, configured to extract, from the $x^{th}$ subband of the frequency-domain signal according to the second frequency interval, the first OQAM symbol carried on the $x^{th}$ subband;

a second inverse-mapping submodule 10032, configured to: after the first OQAM symbol carried on the $x^{th}$ subband is extracted, successively extract, from the $x^{th}$ subband of the frequency-domain signal according to the first frequency interval, the second OQAM symbol to the last OQAM symbol carried on the $x^{th}$ subband; and a third inverse-mapping submodule 10033, configured to extract, according to the second frequency interval, the first OQAM symbol carried on the $(x+1)^{th}$ subband from the $(x+1)^{th}$ subband of the frequency-domain signal; where x refers to any subband in the frequency-domain signal.

It can be learned, from the description about the foregoing embodiment of the present invention, that after receiving an FBMC symbol from a transmitter, a receiver uses the received FBMC signal to obtain a frequency-domain signal, and finally, performs inverse mapping on the frequency-domain signal according to a first frequency interval and a second frequency interval to obtain OQAM symbols carried on at least two subbands, where the first frequency interval exists between adjacent subcarriers in a same subband, the second frequency interval exists between adjacent subcarriers that belong to two adjacent subbands, the second frequency interval is a sum of the first frequency interval and a guard band interval, and the guard band interval is a fractional multiple of the first frequency interval. Because the transmitter generates a second frequency interval between adjacent subcarriers of two adjacent subbands and generates a first frequency interval between adjacent subcarriers in a same subband, the receiver needs to perform inverse mapping on the frequency-domain signal according to the first frequency interval and the second frequency interval, so that the OQAM symbols generated by the transmitter can be restored. Compared with a first frequency interval between adjacent subcarriers in a same subband, a second frequency interval is a sum of the first frequency interval and a guard band interval, and the guard band interval can implement effective isolation between subcarriers of adjacent subbands. By using the guard band interval, it can be implemented that spectrums of adjacent subbands do not overlap, so as to achieve approximate orthogonality. Therefore, mutual interference generated because adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

An embodiment of the present invention further provides a computer storage medium. The computer storage medium stores a program, where the program executes a part or all of the steps described in the foregoing method embodiments.

The following describes another transmitter provided in an embodiment of the present invention. As shown in FIG. 11, a transmitter 1100 includes:

an input apparatus 1101, an output apparatus 1102, a processor 1103, a memory 1104, and a filter 1105 (there may be one or more processors 1103 in the transmitter 1100, and one processor is used as an example in FIG. 11). In some embodiments of the present invention, the input apparatus 1101, the output apparatus 1102, the processor 1103, and the memory 1104 may be connected by using a bus or in another manner, and connection by using a bus is used as an example in FIG. 11.

The processor 1103 is configured to perform the following steps:

generating offset quadrature amplitude modulation OQAM symbols included on at least two subbands;

mapping an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval;

generating an FBMC signal out of the frequency-domain signal; and transmitting the FBMC signal to a receiver.

In some embodiments of the present invention, for OQAM symbols that belong to a same subband, the processor 1103 is specifically configured to perform the following steps:

mapping the $n^{th}$ OQAM symbol on the $x^{th}$ subband onto the $y^{th}$ subcarrier; and mapping the $(n+1)^{th}$ OQAM symbol on the $x^{th}$ subband onto the $(y+1)^{th}$ subcarrier; where the first frequency interval $\Delta f$ exists between the $y^{th}$ subcarrier and the $(y+1)^{th}$ subcarrier, x refers to any one of the at least two subbands, n refers to any OQAM symbol on the $x^{th}$ subband, the $n^{th}$ OQAM symbol and the $(n+1)^{th}$ OQAM symbol are two adjacent OQAM symbols on the $x^{th}$ subband, and x, y, and n are positive integers.

In some embodiments of the present invention, the processor 1103 is specifically configured to perform the following step:

after the mapping the $n^{th}$ OQAM symbol on the $x^{th}$ subband onto the $y^{th}$ subcarrier and the mapping the $(n+1)^{th}$ OQAM symbol on the $x^{th}$ subband onto the $(y+1)^{th}$ subcarrier, that the first frequency interval $\Delta f$ exists between the $y^{th}$ subcarrier and the $(y+1)^{th}$ subcarrier is implemented in the following manner:

inserting (k−1) zeros between the $n^{th}$ OQAM symbol and the $(n+1)^{th}$ OQAM symbol, where k is an overlap factor of a prototype filter.

In some embodiments of the present invention, for OQAM symbols that respectively belong to two subbands, the processor 1103 is specifically configured to perform the following steps: mapping the last OQAM symbol on the $x^{th}$ subband onto the $z^{th}$ subcarrier; and mapping the first OQAM symbol on the $(x+1)^{th}$ subband onto the $(z+1)^{th}$ subcarrier; where the second frequency interval $(m+1)\Delta f$ exists between the $z^{th}$ subcarrier and the $(z+1)^{th}$ subcarrier, where $\Delta f$ represents the first frequency interval, $m\Delta f$ is the guard band interval, m is a fraction greater than 0, and both x and z are positive integers.

In some embodiments of the present invention, the processor 1103 is specifically configured to perform the following step:

after the mapping the last OQAM symbol on the $x^{th}$ subband onto the $z^{th}$ subcarrier and the mapping the first OQAM symbol on the $(x+1)^{th}$ subband onto the $(z+1)^{th}$ subcarrier, that the second frequency interval $(m+1)\Delta f$ exists between the $z^{th}$ subcarrier and the $(z+1)^{th}$ subcarrier is implemented in the following manner:

inserting (k+p−1) zeros between the last OQAM symbol and the first OQAM symbol, where k is an overlap factor of a prototype filter, and p is an outband suppression factor of the prototype filter.

In some embodiments of the present invention, the processor 1103 is further configured to perform the following step: before the mapping an OQAM symbol on each subband onto a respective subcarrier, acquiring the guard band interval according to the overlap factor and outband suppression factor of the prototype filter, and the first frequency interval, where the guard band interval is acquired in the following manner:

$$G = \frac{P}{K}\Delta f,$$

where

G is the guard band interval, K is the overlap factor of the prototype filter, P is the outband suppression factor of the prototype filter, and $\Delta f$ is the first frequency interval.

In some embodiments of the present invention, the processor 1103 is further configured to perform the following step: before the generating an FBMC signal out of the frequency-domain signal, performing precoding on the OQAM symbol on each subband in the frequency-domain signal.

In some embodiments of the present invention, the processor 1103 is specifically configured to perform the following step:

generating OQAM symbols carried on a same subband for a same user.

In some embodiments of the present invention, the processor 1103 is specifically configured to perform the following steps:

performing frequency-domain filtering on the frequency-domain signal;

performing inverse discrete Fourier transform IDFT on the frequency-domain signal obtained after frequency-domain filtering, to obtain a time-domain signal; and performing time-domain offsetting and superposition on the time-domain signal to obtain the FBMC signal.

It can be learned, from the description about the foregoing embodiment of the present invention, that after generating OQAM symbols included on at least two subbands, a transmitter maps an OQAM symbol on each subband onto a respective subcarrier to obtain a frequency-domain signal, where a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval; then generates an FBMC signal out of the frequency-domain signal; and finally, transmits the FBMC signal to a receiver. The transmitter generates a second frequency interval between adjacent subcarriers of two adjacent subbands; therefore, compared with a first frequency interval between adjacent subcarriers in a same subband, the second frequency interval is a sum of the first frequency interval and a guard band interval, and the guard band interval can implement effective isolation between subcarriers of adjacent subbands. By using the guard band interval, it can be implemented that spectrums of adjacent subbands do not overlap, so as to achieve approximate orthogonality. Therefore, mutual interference generated because adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

Figure 12:
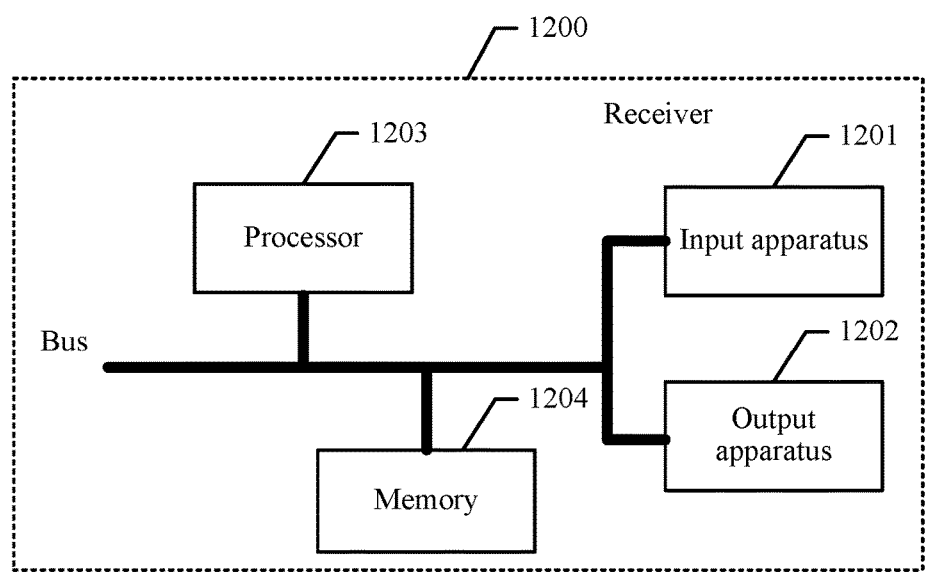
FIG. 12 is a schematic structural diagram of another receiver according to an embodiment of the present invention.

The following describes another receiver provided in an embodiment of the present invention. Referring to FIG. 12-A, a receiver 1200 includes:

an input apparatus 1201, an output apparatus 1202, a processor 1203, a memory 1204, and a filter 1205 (there may be one or more processors 1203 in the receiver 1200, and one processor is used as an example in FIG. 12). In some embodiments of the present invention, the input apparatus 1201, the output apparatus 1202, the processor 1203, and the memory 1204 may be connected by using a bus or in another manner, and connection by using a bus is used as an example in FIG. 12.

The processor 1203 is configured to perform the following steps:

receiving an FBMC signal;

using the received FBMC signal to obtain a frequency-domain signal; and performing inverse mapping on the frequency-domain signal according to a first frequency interval and a second frequency interval to obtain quadrature amplitude modulation OQAM symbols carried on at least two subbands, where the first frequency interval is a frequency interval existing between adjacent subcarriers in a same subband, the second frequency interval is a frequency interval existing between adjacent subcarriers that belong to two adjacent subbands, the second frequency interval is a sum of the first frequency interval and a guard band interval, and the guard band interval is a fractional multiple of the first frequency interval.

In some embodiments of the present invention, the processor 1203 is specifically configured to perform the following steps:

performing time-domain symbol extraction on the received FBMC signal to obtain a time-domain signal;

performing discrete Fourier transform DFT on the time-domain signal obtained by time-domain symbol extraction, to obtain a DFT-transformed signal; and performing frequency-domain filtering on the DFT-transformed signal to obtain the frequency-domain signal.

In some embodiments of the present invention, the processor 1203 is further configured to perform the following step: before the performing frequency-domain filtering on the DFT-transformed signal, performing channel equalization on the DFT-transformed signal.

In some embodiments of the present invention, the processor 1203 is further configured to perform the following step: if the received FBMC signal is a downlink signal, after the using the received FBMC signal to obtain a frequency-domain signal, screening out, from the frequency-domain signal, a frequency-domain signal mapped onto a preset subcarrier.

The performing inverse mapping on the frequency-domain signal according to a first frequency interval and a second frequency interval includes:

performing, according to the first frequency interval and the second frequency interval, inverse mapping on the frequency-domain signal mapped onto the preset subcarrier.

In some embodiments of the present invention, the processor 1203 is further configured to perform the following step: after the performing inverse mapping on the frequency-domain signal according to a first frequency interval and a second frequency interval to obtain quadrature amplitude modulation OQAM symbols carried on at least two subbands, performing channel equalization on the OQAM symbols.

In some other embodiments of the present invention, the processor 1203 is specifically configured to perform the following steps:

extracting, from the $x^{th}$ subband of the frequency-domain signal according to the second frequency interval, the first OQAM symbol carried on the $x^{th}$ subband;

after the first OQAM symbol carried on the $x^{th}$ subband is extracted, successively extracting, from the $x^{th}$ subband of the frequency-domain signal according to the first frequency interval, the second OQAM symbol to the last OQAM symbol carried on the $x^{th}$ subband; and extracting, according to the second frequency interval, the first OQAM symbol carried on the $(x+1)^{th}$ subband from the $(x+1)^{th}$ subband of the frequency-domain signal; where x refers to any subband in the frequency-domain signal.

It can be learned, from the description about the foregoing embodiment of the present invention, that after receiving an FBMC symbol from a transmitter, a receiver uses the received FBMC signal to obtain a frequency-domain signal, and finally, performs inverse mapping on the frequency-domain signal according to a first frequency interval and a second frequency interval to obtain OQAM symbols carried on at least two subbands, where the first frequency interval exists between adjacent subcarriers in a same subband, the second frequency interval exists between adjacent subcarriers that belong to two adjacent subbands, the second frequency interval is a sum of the first frequency interval and a guard band interval, and the guard band interval is a fractional multiple of the first frequency interval. Because the transmitter generates a second frequency interval between adjacent subcarriers of two adjacent subbands and generates a first frequency interval between adjacent subcarriers in a same subb and, the receiver needs to perform inverse mapping on the frequency-domain signal according to the first frequency interval and the second frequency interval, so that the OQAM symbols generated by the transmitter can be restored. Compared with a first frequency interval between adjacent subcarriers in a same subband, a second frequency interval is a sum of the first frequency interval and a guard band interval, and the guard band interval can implement effective isolation between subcarriers of adjacent subbands. By using the guard band interval, it can be implemented that spectrums of adjacent subbands do not overlap, so as to achieve approximate orthogonality. Therefore, mutual interference generated because adjacent subbands experience different channels can be canceled by using the guard band interval. In addition, because the guard band interval is a fractional multiple of the first frequency interval and does not exceed a complete interval between adjacent subcarriers, occupation of spectrum resources is reduced by using the fractional-multiple guard band interval.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A filter bank multi-carrier (FBMC) signal transmitting method comprising:
    generating, by a transmitter, offset quadrature amplitude modulation (OQAM) symbols comprised on at least two subbands;
    mapping by the transmitter, an OQAM symbol on each subband onto a respective subcarrier to obtain a frequency-domain signal, wherein a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval;
    performing, by the transmitter, frequency-domain filtering on the frequency-domain signal;
    performing, by the transmitter, inverse discrete Fourier transform (IDFT) on the frequency-domain signal obtained after the frequency-domain filtering, to obtain a time-domain signal;
    performing, by the transmitter, time-domain offsetting and superposition on the time-domain signal to obtain the FBMC signal; and
    transmitting, by the transmitter, the FBMC signal to a receiver.

2. The method according to claim 1, wherein for OQAM symbols that belong to a same subband, the mapping the OQAM symbol on each subband onto the respective subcarrier comprises:
    mapping the $n^{th}$ OQAM symbol on the $x^{th}$ subband onto the $y^{th}$ subcarrier; and
    mapping the $(n+1)^{th}$ OQAM symbol on the $x^{th}$ subband onto the $(y+1)^{th}$ subcarrier; wherein
    the first frequency interval $\Delta f$ exists between the $y^{th}$ subcarrier and the $(y+1)^{th}$ subcarrier, x refers to any one of the at least two subbands, n refers to any OQAM symbol on the $x^{th}$ subband, the $n^{th}$ OQAM symbol and the $(n+1)^{th}$ OQAM symbol are two adjacent OQAM symbols on the $x^{th}$ subband, and x, y, and n are positive integers.

3. The method according to claim 2, wherein after the mapping the $n^{th}$ OQAM symbol on the $x^{th}$ subband onto the $y^{th}$ subcarrier and the mapping the $(n+1)^{th}$ OQAM symbol on the $x^{th}$ subband onto the $(y+1)^{th}$ subcarrier, that the first frequency interval $\Delta f$ exists between the $y^{th}$ subcarrier and the $(y+1)^{th}$ subcarrier is implemented in the following manner:
    inserting (k−1) zeros between the $n^{th}$ OQAM symbol and the $(n+1)^{th}$ OQAM symbol, wherein
    k is an overlap factor of a prototype filter.

4. The method according to claim 1, wherein for OQAM symbols that respectively belong to two subbands, the mapping the OQAM symbol on each subband onto the respective subcarrier comprises:
    mapping the last OQAM symbol on the $x^{th}$ subband onto the $z^{th}$ subcarrier; and
    mapping the first OQAM symbol on the $(x+1)^{th}$ subband onto the $(z+1)^{th}$ subcarrier; wherein
    the second frequency interval $(m+1)\Delta f$ exists between the $z^{th}$ subcarrier and the $(z+1)^{th}$ subcarrier, wherein $\Delta f$ represents the first frequency interval, $m\Delta f$ is the guard band interval, m is a fraction greater than 0, and both x and z are positive integers.

5. The method according to claim 4, wherein after the mapping the last OQAM symbol on the $x^{th}$ subband onto the $z^{th}$ subcarrier and the mapping the first OQAM symbol on the $(x+1)^{th}$ subband onto the $(z+1)^{th}$ subcarrier, that the second frequency interval $(m+1)\Delta f$ exists between the $z^{th}$ subcarrier and the $(z+1)^{th}$ subcarrier is implemented in the following manner:

inserting (k+p−1) zeros between the last OQAM symbol and the first OQAM symbol, wherein k is an overlap factor of a prototype filter, and p is an outband suppression factor of the prototype filter.

6. The method according to claim 1, wherein before the mapping the OQAM symbol on each subband onto the respective subcarrier, the method further comprises:

acquiring the guard band interval according to the overlap factor and outband suppression factor of the prototype filter, and the first frequency interval, wherein the guard band interval is acquired in the following manner:

$$G = \frac{P}{K}\Delta f,$$

wherein

G is the guard band interval, K is the overlap factor of the prototype filter, P is the outband suppression factor of the prototype filter, and $\Delta f$ is the first frequency interval.

7. The method according to claim 1, wherein before the generating the FBMC signal out of the frequency-domain signal, the method further comprises:

performing precoding on the OQAM symbol on each subband in the frequency-domain signal.

8. The method according to claim 1, wherein the generating the OQAM symbols on the at least two subbands comprises:

generating OQAM symbols carried on a same subband for a same user.

9. A filter bank multi-carrier (FBMC) signal receiving method comprising:

receiving, by a receiver, an FBMC signal;

performing, by the receiver, time-domain symbol extraction on the received FBMC signal to obtain a time-domain signal;

performing, by the receiver, a discrete Fourier transform (DFT) on the time-domain signal to obtain a DFT-transformed signal; and performing, by the receiver, frequency-domain filtering on the DFT-transformed signal to obtain a frequency-domain signal; and performing, by the receiver, inverse mapping on the frequency-domain signal according to a first frequency interval and a second frequency interval to obtain offset quadrature amplitude modulation (OQAM) symbols carried on at least two subbands, wherein the first frequency interval is a frequency interval existing between adjacent subcarriers in a same subband, the second frequency interval is a frequency interval existing between adjacent subcarriers that belong to two adjacent subbands, the second frequency interval is a sum of the first frequency interval and a guard band interval, and the guard band interval is a fractional multiple of the first frequency interval.

10. The method according to claim 9, wherein before the performing frequency-domain filtering on the DFT-transformed signal, the method further comprises:

performing channel equalization on the DFT-transformed signal.

11. The method according to claim 9, wherein if the received FBMC signal is a downlink signal, after the using the received FBMC signal to obtain the frequency-domain signal, the method further comprises:

screening out, from the frequency-domain signal, a frequency-domain signal mapped onto a preset subcarrier; and wherein the performing the inverse mapping on the frequency-domain signal according to the first frequency interval and the second frequency interval comprises:

performing, according to the first frequency interval and the second frequency interval, the inverse mapping on the frequency-domain signal mapped onto the preset subcarrier.

12. The method according to claim 9, wherein after the performing the inverse mapping on the frequency-domain signal according to the first frequency interval and the second frequency interval to obtain the OQAM symbols carried on at least two subbands, the method further comprises:

performing channel equalization on the OQAM symbols.

13. The method according to claim 9, wherein the performing the inverse mapping on the frequency-domain signal according to the first frequency interval and the second frequency interval to obtain the OQAM symbols carried on at least two subbands comprises:

extracting, from the $x^{th}$ subband of the frequency-domain signal according to the second frequency interval, the first OQAM symbol carried on the $x^{th}$ subband;

after the first OQAM symbol carried on the $x^{th}$ subband is extracted, successively extracting, from the $x^{th}$ subband of the frequency-domain signal according to the first frequency interval, the second OQAM symbol to the last OQAM symbol carried on the $x^{th}$ subband; and extracting, according to the second frequency interval, the first OQAM symbol carried on the $(x+1)^{th}$ subband from the $(x+1)^{th}$ subband of the frequency-domain signal; wherein x refers to any subband in the frequency-domain signal.

14. A transmitter comprising:

a processor; and a memory storing a plurality of computer executable instructions stored thereon, when executed by the processor, causes the processor to generate offset quadrature amplitude modulation (OQAM) symbols comprised on at least two subbands;

map an OQAM symbol on each subband onto a respective subcarrier to obtain a frequency-domain signal, wherein a first frequency interval exists between adjacent subcarriers in a same subband, a second frequency interval exists between adjacent subcarriers that belong to two adjacent subbands, the second frequency interval is a sum of the first frequency interval and a guard band interval, and the guard band interval is a fractional multiple of the first frequency interval;

perform frequency-domain filtering on the frequency-domain signal;

perform an inverse discrete Fourier transform (IDFT) on the frequency-domain signal to obtain a time-domain signal;

perform time-domain offsetting and superposition on the time-domain signal to obtain a filter bank multi-carrier (FBMC) signal; and transmit the FBMC signal to a receiver.

15. The transmitter according to claim 14, wherein for OQAM symbols that belong to a same subband, the processor is further configured to: map the $n^{th}$ OQAM symbol on the $x^{th}$ subband onto the $y^{th}$ subcarrier; and map the $(n+1)^{th}$ OQAM symbol on the $x^{th}$ subband onto the $(y+1)^{th}$ subcarrier; wherein the first frequency interval $\Delta f$ exists between the $y^{th}$ subcarrier and the $(y+1)^{th}$ subcarrier, x refers to any one of the at least two subbands, n refers to any OQAM symbol on the $x^{th}$ subband, the $n^{th}$ OQAM symbol and the $(n+1)^{th}$ OQAM symbol are two adjacent OQAM symbols on the $x^{th}$ subband, and x, y, and n are positive integers.

16. A receiver comprising:

a processor; and a memory storing a plurality of computer executable instructions stored thereon, when executed by the processor, causes the processor to receive a filter bank multi-carrier (FBMC) signal;

perform time-domain symbol extraction on the received FBMC signal to obtain a time-domain signal;

perform a discrete Fourier transform (DFT) on the time-domain signal to obtain a DFT-transformed signal;

perform frequency-domain filtering on the DFT-transformed signal to obtain a frequency-domain signal; and perform inverse mapping on the frequency-domain signal according to a first frequency interval and a second frequency interval to obtain offset quadrature amplitude modulation (OQAM) symbols carried on at least two subbands, wherein the first frequency interval is a frequency interval existing between adjacent subcarriers in a same subband, the second frequency interval is a frequency interval existing between adjacent subcarriers that belong to two adjacent subbands, the second frequency interval is a sum of the first frequency interval and a guard band interval, and the guard band interval is a fractional multiple of the first frequency interval.

17. The receiver according to claim 16, wherein the memory stores further computer readable instructions, when executed by the processor, further cause the processor to:

perform channel equalization on the DFT-transformed signal before the filter performs frequency-domain filtering on the DFT-transformed signal.

* * * * *